United States Patent
Takahashi et al.

(10) Patent No.: US 8,891,716 B2
(45) Date of Patent: Nov. 18, 2014

(54) NODE DEVICE AND METHOD FOR SYNCHRONIZING CLOCK TIMES

(71) Applicant: Fujitsu Limited, Kawasaki (JP)

(72) Inventors: Yuji Takahashi, Minato (JP); Kouki Shigaki, Fukuoka (JP); Katsumi Sugawa, Miyaji (JP); Tadashige Iwao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/310,290

(22) Filed: Jun. 20, 2014

(65) Prior Publication Data

US 2014/0301513 A1    Oct. 9, 2014

Related U.S. Application Data

(63) Continuation of application No. PCT/JP2011/080516, filed on Dec. 28, 2011.

(51) Int. Cl.
*H04L 7/00* (2006.01)
*H04J 3/06* (2006.01)

(52) U.S. Cl.
CPC ............ *H04L 7/0012* (2013.01); *H04L 7/0037* (2013.01)
USPC ............................ 375/371; 375/356; 370/516

(58) Field of Classification Search
USPC .......... 375/354, 356, 371, 372, 373; 370/503, 370/516
See application file for complete search history.

(56) References Cited

U.S. PATENT DOCUMENTS 7,508,845 B2 *   3/2009   Baker ........................... 370/516

2009/0190589 A1 *   7/2009   Bains et al. .................... 370/392
2012/0027030 A1    2/2012   Naito et al.
2012/0106552 A1    5/2012   Iwao et al.

FOREIGN PATENT DOCUMENTS

| JP | 9-83608 A | 3/1997 |
| JP | 2006-93967 A | 4/2006 |
| WO | 2010/116968 A1 | 10/2010 |
| WO | 2011/013165 A1 | 2/2011 |

OTHER PUBLICATIONS

International Search Report, mailed in connection with PCT/JP2011/080516 and mailed Mar. 13, 2012.
Notification of Transmittal of Translation of the International Preliminary Report on Patentability (Form PCT/IB/338, Form PCT/IB/373 & Form PCT/ISA/237), PCT/JP2011/080516, 8 pages, dated Jul. 10, 2014.

* cited by examiner

*Primary Examiner* — Tesfaldet Bocure
(74) *Attorney, Agent, or Firm* — Fujitsu Patent Center

(57) ABSTRACT

A node device includes a processor, a wireless RF circuit, a memory, and a timer. The processor measures a clock time. The wireless RF circuit receives a clock time information frame containing clock time information used for correcting the clock time. The memory stores a transmission processing time period, as a fixed value, from when a transmission source node device of the clock time information frame obtains the clock time information until when the transmission source node device transmits the clock time information frame. The timer measures a reception processing time period, which is a period of time from when the clock time information frame is received until when the clock time information is obtained. The node device sets to the processor a value obtained by adding the fixed value and the reception processing time period to the clock time information.

9 Claims, 15 Drawing Sheets

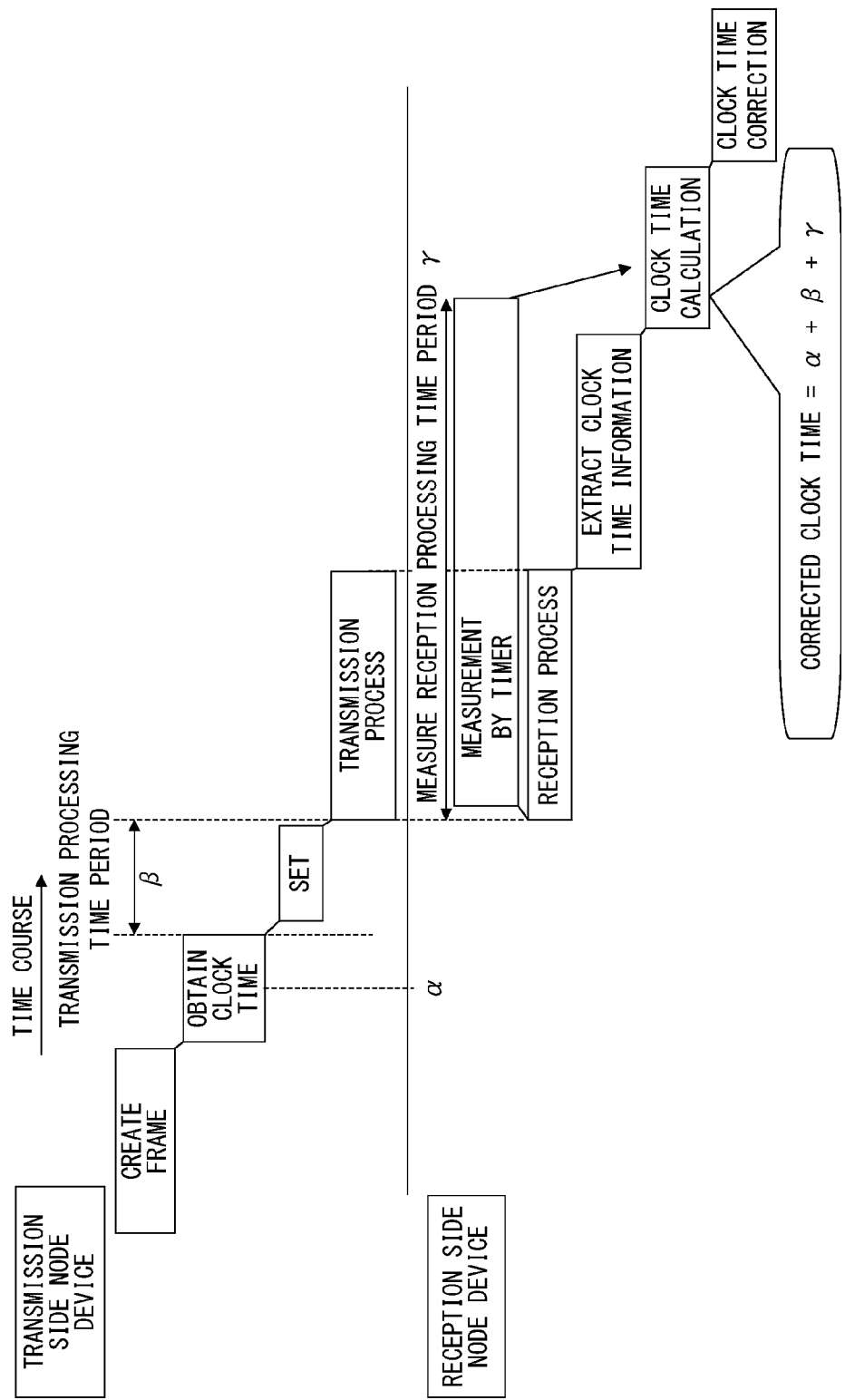
F I G. 1

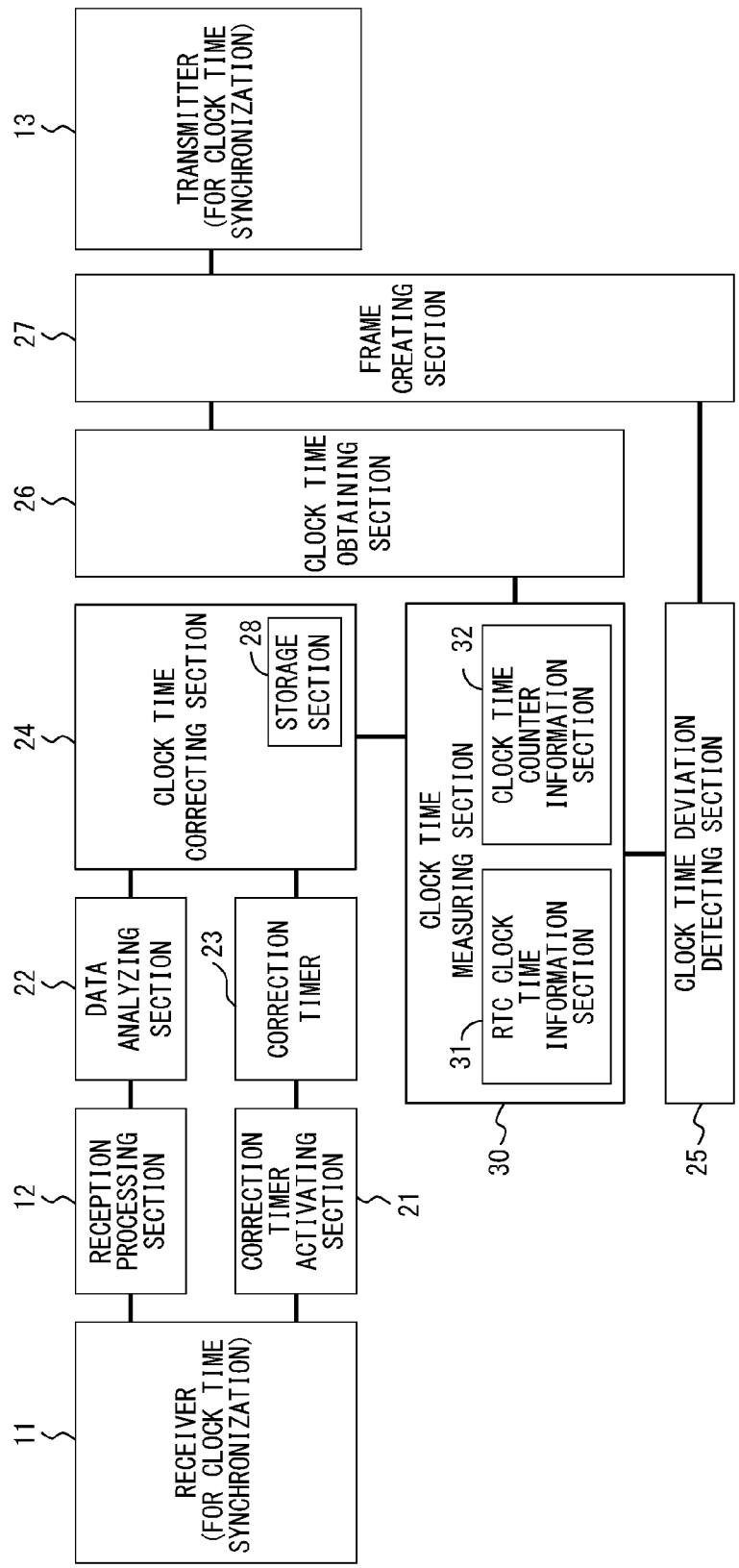
F I G. 5

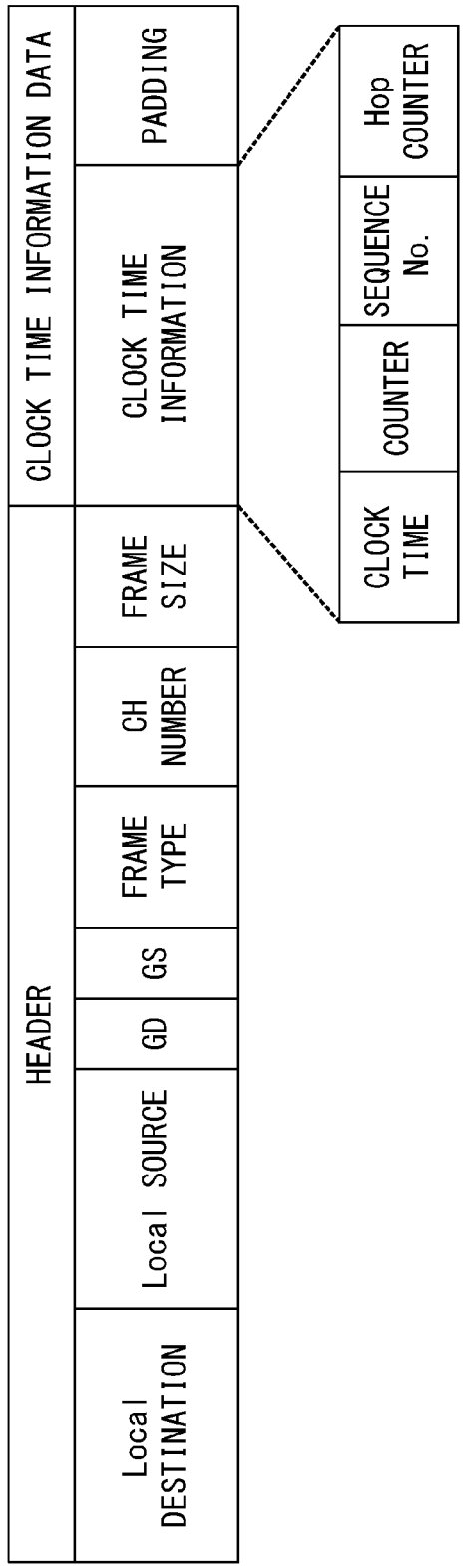
F I G. 7

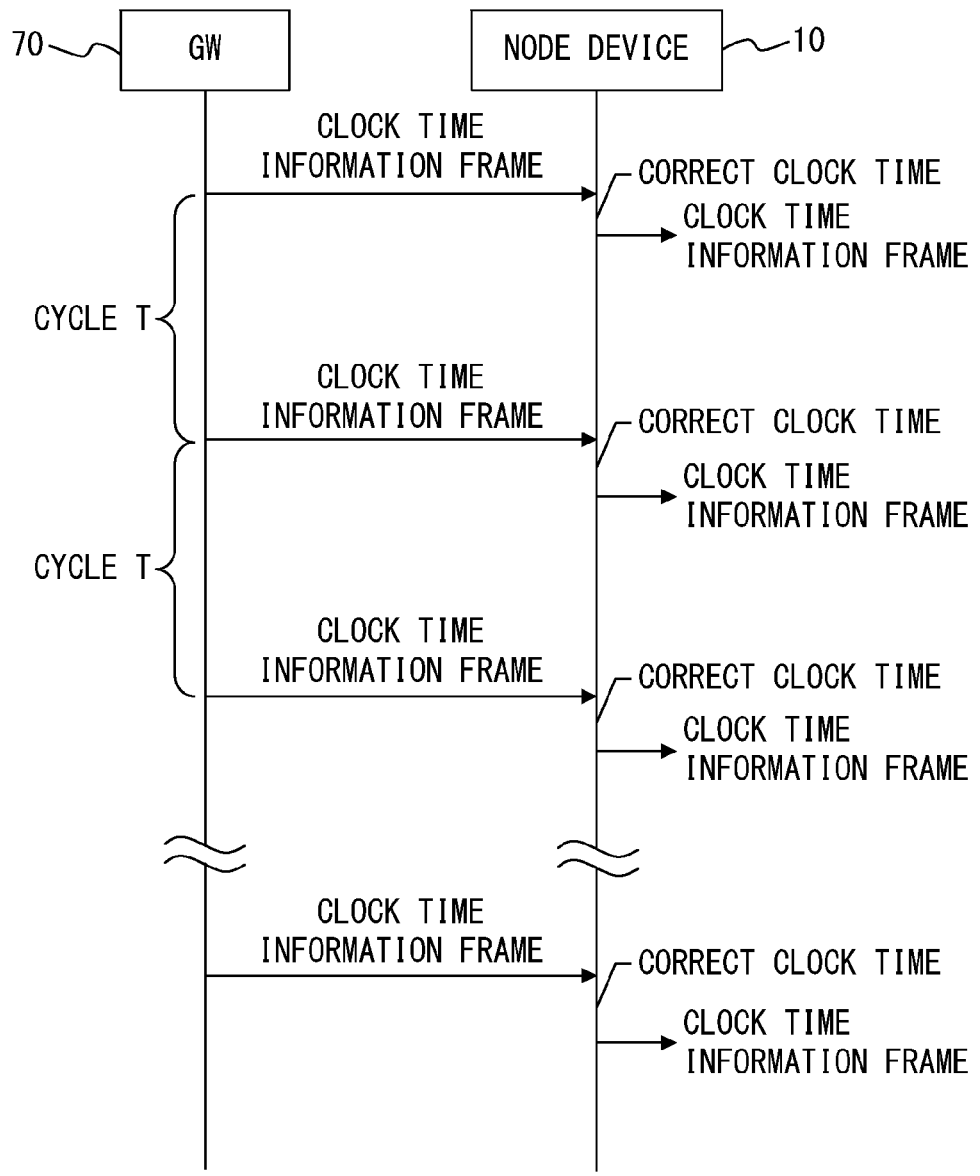
F I G. 8

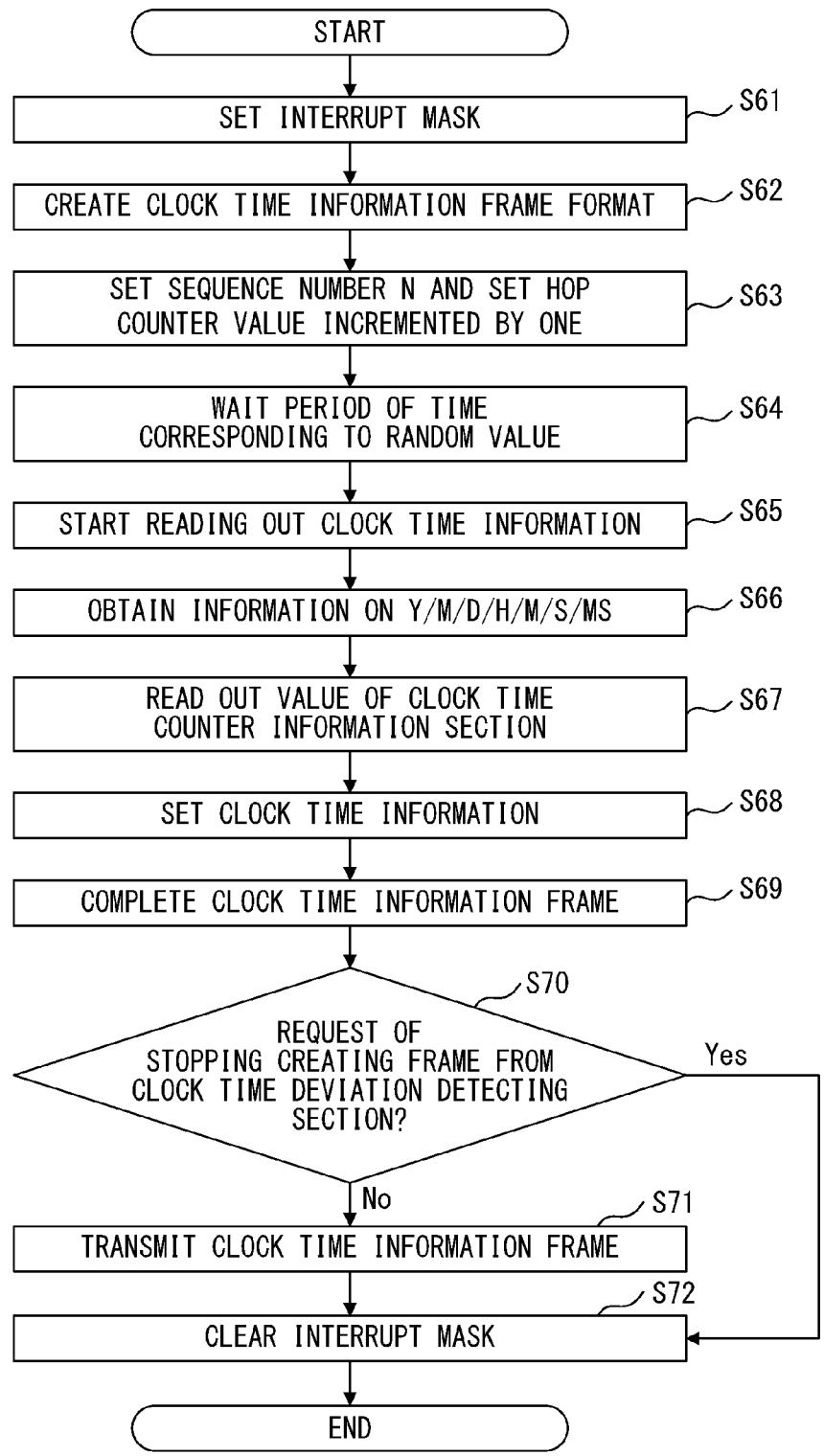
F I G. 1 3

NODE DEVICE AND METHOD FOR SYNCHRONIZING CLOCK TIMES

CROSS-REFERENCE TO RELATED APPLICATION

This application is a continuation application of International Application PCT/JP2011/080516 filed on Dec. 28, 2011 and designated the U.S., the entire contents of which are incorporated herein by reference.

FIELD

The embodiments discussed herein relate to a node device, and a method for synchronizing clock times performed among a plurality of node devices.

BACKGROUND

A system has been devised in recent years in which a plurality of sensors are installed in structures such as buildings and bridges, and a center server collects obtained measurement values to observe displacements generated in the structures (structural health monitoring). In this case, each sensor transmits the obtained measurement value to the center server. Thus, a wired or wireless ad-hoc network may be applied to such a sensor network.

Clock time data may be used for measuring some physical quantities that are measured in the sensor network. For example, in the case where an acceleration sensor is used for measuring a magnitude of deflection of a structure or a shock of an earthquake, clock time information is used for calculating an acceleration. An allowable difference among clock times of sensors included in the same sensor network varies depending on a sampling interval and a magnitude of an allowable error. For example, if the sampling interval is 5 ms and the allowable error is 5%, differences in clock times among the sensors are maintained within 250 μs or less. The differences in clock times however occur among the sensors even after the sensors are synchronized in clock time, due to deviation of a frequency on which the sensor operates, or the like. For this reason, clock time synchronization is periodically performed among the sensors included in the same sensor network. Methods for synchronizing clock times among a plurality of sensors include a method in which individual sensors adjust respective clock times by using a radio clock, a GPS (Global Positioning System), an NTP (Network Time Protocol), or the like. In addition, an RBS (Reference Broadcast Synchronization), a TPSN (Timing-sync Protocol for Sensor Networks), an FTSP (Flooding Time Synchronization Protocol), and the like are known as methods accompanied by a control in a Media Access Control (MAC) layer.

As a related art, a method is known in which a first device transmits a token containing clock time information to a second device, and the second device corrects a clock time thereof using the token and transmits a token containing clock time information to which a processing time period is added, to a third device. Furthermore, a transmitting device is also known that transmits, upon receiving a clock time data transmission request from a receiving device, a fixed-length frame containing clock time data converted into a code that will not be subjected to zero insertion in binary coding and a transmission delay time, to the receiving device.

As an art relating to an ad-hoc network, a node device has been proposed that stores identification information of a frame to be transmitted while associating it with a neighboring node device being a transmission destination, and with a transfer source that first transfers the frame to be transmitted. This node device compares, upon receiving a frame, an identification number of the received frame with an identification number of a frame to be transmitted to check a transmission route of the frame for a loop.

For example, some literatures are known such as Japanese Patent Laid-Open No. 9-83608, Japanese Patent Laid-Open No. 2006-93967, and International Publication No. WO 2011/013165.

In the case where individual node devices correct respective clock times using the radio clock or the NTP to adjust the clock times among the node devices, magnitudes of errors that occur among the node devices are greater than an error that is allowed in a sensor system used for measuring a physical quantity. Therefore, even when the individual node devices adjust the clock times using the radio clock or the NTP, the clock time synchronization is not performed to a precision required in the sensor system. In the case where individual node devices synchronize the clock times using the GPS, although the synchronization among the node devices is performed with high precision, the individual node devices each consume more power, which is not suitable for node devices used in the sensor network. Furthermore, hardware used in the method for synchronizing clock times such as the RBS, the TPSN, and the FTSP, may be customized because the methods each need an unique process to be performed. A problem of the customized hardware is in that there is no compatibility among chips included in node devices. Furthermore, the methods for synchronizing clock times such as the RBS, the TPSN, and the FTSP are difficult to apply to node devices used in the sensor network because there are problems with them such as increased power consumption in the clock time synchronization process, and a small number of node devices that can synchronize the clock times.

The method for transmitting and receiving a fixed-length frame containing the clock time information requires a frame to be transmitted and received to have a fixed length, which may be difficult to be applied to the sensor network. Furthermore, the method in which one of the devices in the network adjusts the clock time using a token is not applied to the case where a large number of node devices are included in the ad-hoc network.

SUMMARY

According to an aspect of the embodiments, a node device includes a processor, a wireless RF circuit, a memory, and a timer. The processor measures a clock time. The wireless RF circuit receives a clock time information frame, which is a frame that contains clock time information used for correcting the clock time. The memory stores a transmission processing time period, as a fixed value, from a point in time when a transmission source node device of the clock time information frame obtains the clock time information until a point in time when the transmission source node device transmits the clock time information frame. The timer measures a reception processing time period, which is a period of time from a point in time when the clock time information frame is received until a point in time where the clock time information is obtained from the clock time information frame. The node device sets to the processor a value obtained by adding the fixed value and the reception processing time period to the clock time information so as to correct a clock time measured by the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating an example of a method for synchronizing clock times according to an embodiment.

FIG. 5 is a block diagram on how the node device transmits and receives a clock time information frame.

FIG. 7 is a diagram illustrating an example of a format of a clock time information frame.

FIG. 8 is a diagram illustrating an example of transmission of clock time information frames.

FIG. 13 is a flowchart illustrating an example of an operation of the node device at the time of transmitting the clock time information frame.

DESCRIPTION OF EMBODIMENT

Figure 2:
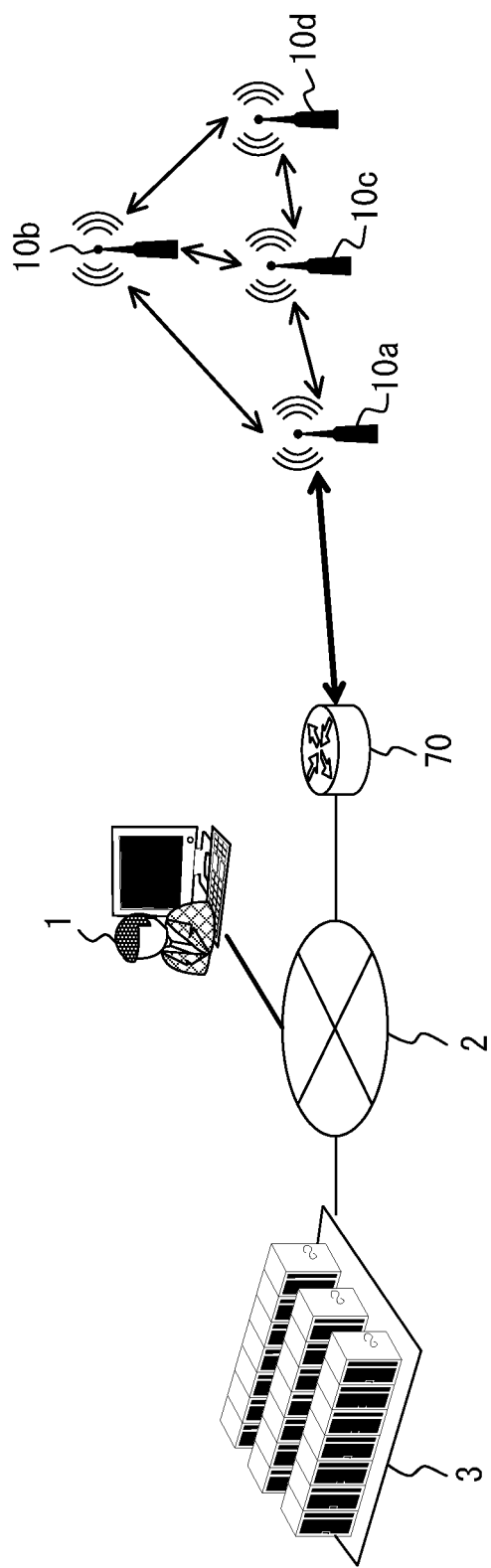
FIG. 2 is a diagram illustrating an example of a network in which node devices according to the embodiment are used.

FIG. 1 illustrates an example of a method for synchronizing clock times according to the embodiment. A node device on a transmission side transmits a clock time information frame containing clock time information to a node device on a reception side. At this point, the node device on the transmission side and the node device on the reception side store a period of time as a fixed value in advance, the period of time from obtaining the clock time information by the node device on the transmission side until transmitting the clock time information frame. Hereafter, the period of time from obtaining the clock time information by the node device until transmitting the frame containing the clock time information will be referred to as "transmission processing time period." In FIG. 1, the transmission processing time period is denoted by β.

First, the node device on the transmission side creates a clock time information frame whose clock time information is not set, in order to synchronize clock times. Furthermore, the node device on the transmission side obtains clock time information. The example of FIG. 1 illustrates the case where the node device on the transmission side obtains clock time information representing a clock time α. The node device on the transmission side sets the obtained clock time information to the clock time information frame, and transmits the clock time information frame upon completion of setting the clock time information. Here, it is assumed that the transmitting node device performs a process from obtaining the clock time information to starting the transmission, for a transmission processing time period (β) that has been stored in advance.

On the other hand, the node device on the reception side extracts the clock time information contained in the clock time information frame upon receiving the clock time information frame. At this point, the node device on the reception side starts measuring a reception processing time period at the time of starting the reception of the clock time information frame. The term "reception processing time period" can be defined as a period of time from a point in time of starting the reception of the clock time information frame by the node device until a point in time of obtaining updated clock time information being clock time information that the node device can use for updating the clock time thereof. Alternately, the reception processing time period can be defined as a period of time from a point in time of starting the reception of the clock time information frame by the node device on the reception side until a point in time of calculating a value obtained by adding the transmission processing time period β to the clock time information (clock time α) contained in the clock time information frame. The reception processing time period is denoted by γ in FIG. 1. The node device on the reception side adjusts the clock time thereof using the value obtained by adding the transmission processing time period and the reception processing time period to the clock time information contained in the clock time information frame. That is, in the example of FIG. 1, a clock time α+β+γ is used as a value for correcting the clock time.

The node device whose clock time correction has been completed notifies other node devices of the clock time information by transmitting a clock time information frame thereto. Also at this point, the clock time information frame is transmitted at a point in time when the transmission processing time period elapses from the point in time of obtaining the clock time information. A node device that receives the clock time information frame corrects the clock time thereof by performing a similar process, and synchronizes the clock time with that of the node device that is a transmission source of the clock time information frame. Note that an interval of the clock time synchronization is any interval with which a synchronization precision can be satisfied.

In such a manner, the transmission processing time period is set at a fixed value, and stored in the node device on the transmission side and the node device on the reception side in advance, which allows the node device on the reception side to correct the period of time that elapses from obtaining the clock time information until transmitting the clock time information by the node device being the transmission source. Furthermore, the node device on the reception side also performs a correction using a value obtained by measuring a period of time to process the clock time information frame. Therefore, the node device on the transmission side and the node device on the reception side can be synchronized in clock time with high precision.

Example of Network and Device Configuration

FIG. 2 illustrates an example of a network in which the node devices according to the embodiment are used. In the example of FIG. 2, the network includes a center server 1, a network 2, an NTP server 3, a gateway 70, and node devices 10a to 10d. The node devices 10a to 10d include sensors, and physical quantities obtained from the sensors are transmitted to the gateway 70 through an ad-hoc network. Meanwhile, the gateway 70 transmits the data obtained through the ad-hoc network to the center server 1 via the network 2. The center server 1 analyzes the pieces of data measured by the individual node devices 10.

Here, the gateway 70 and the node devices 10a to 10d form the ad-hoc network and synchronize clock times thereof at fixed time intervals. In the following description, as illustrated in the example of FIG. 2, it is assumed that the gateway 70 obtains latest clock time information by communicating with the NTP server 3. Note that the clock time information can be in any format that can uniquely represent a certain clock time. For example, the clock time information may be information representing a certain clock time such as "3 second 2 minute 1 o'clock, Dec. 7, 2011" (absolute clock time), or may be a counter value representing a period of time up to a given timing. Furthermore, the clock time information may be formatted on a year, month, day, hour, minute, and second basis, or the like, or may be formatted in Unix time. Moreover, the method in which the gateway 70 illustrated in FIG. 2 obtains the clock time information is one example, and the gateway 70 can also obtain latest clock time information from, for example, the radio clock or the GPS.

In the example of FIG. 2, two-way arrows connect between neighboring nodes in the ad-hoc network. In the following description, a node device positioned in a range capable of receiving a frame transmitted from a certain node device may be referred to as a "neighboring node" of the certain node device. In addition, when a plurality of node devices are in positions at which they can transmit/receive frames to/from one another, it will be referred to as "to neighbor." Therefore, in the example of FIG. 2, the gateway 70 can transmits/receives frames to/from the node device 10a, but the gateway 70 does not transmit/receive frames directly to/from the node devices 10b to 10d.

Figure 3:
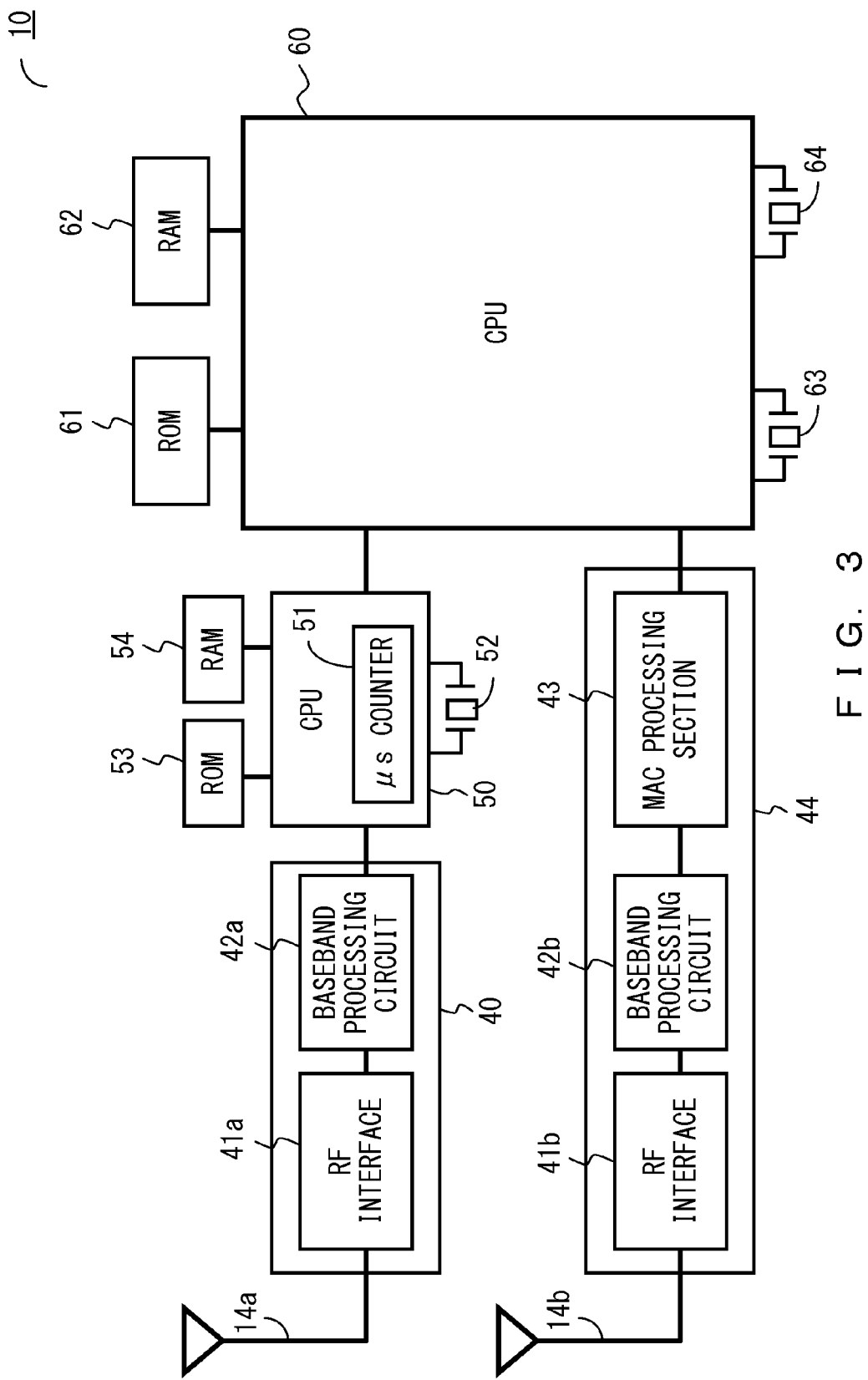
FIG. 3 is a diagram illustrating an example of a configuration of the node device.

FIG. 3 is a diagram illustrating an example of a configuration of the node device 10. The node device 10 includes antennas 14 (14a and 14b), wireless RF (Radio Frequency) circuits 40 and 44, and Central Processing Units (CPUs) 50 and 60. In the following example, it is assumed that the node device 10 performs a process with respect to the clock time synchronization using the CPU 50, the wireless RF circuit 40, and the antenna 14a. On the other hand, it is assumed that processes other than the clock time synchronization, such as a process of measurement value obtained by a sensor (not illustrated) and transmission and reception of data, are performed by the CPU 60, the wireless RF circuit 44, and the antenna 14b. Note that it is assumed that the sensor is connected to the CPU 60. In the following description, it is assumed that the clock time information frame is transmitted and received through the antenna 14a, and frames other than the clock time information frame are transmitted and received through the antenna 14b. Note that any method can be used for making frames that can be transmitted and received have different types for each of the antenna 14a and the antenna 14b. For example, the antenna 14a and the antenna 14b can use different frequencies for the transmission and reception, and the antenna 14a and the antenna 14b can use different channels for communication.

The antenna 14a outputs the received signal to the wireless RF circuit 40. The wireless RF circuit 40 includes an RF interface 41a and a baseband processing circuit 42a. The RF interface 41a is a circuit for converting the signal received through the antenna 14a into a baseband signal. The baseband processing circuit 42a processes the baseband signal input from the RF interface 41a, and outputs the processed signal to the CPU 50. In addition, at the time of transmitting the clock time information frame, the baseband processing circuit 42a converts the clock time information frame created by the CPU 50 into the baseband signal and outputs the baseband signal to the RF interface 41a. The RF interface 41a outputs a signal that is obtained by converting the input baseband signal using a carrier wave, to the antenna 14a. The CPU 50 includes a μs counter 51, and further performs processes such as analysis of the clock time information frame, the clock time synchronization, and creation of the clock time information frame to be transmitted to the other node devices 10, using a high precision clock 52, a read only memory (ROM) 53, and a random access memory (RAM) 54. These processes will be described hereafter.

The antenna 14b outputs the received signal to the wireless RF circuit 44. The wireless RF circuit 44 includes an RF interface 41b, a baseband processing circuit 42b, and a MAC processing section 43. The MAC processing section 43 is, for example, a processing circuit that may be called a MAC chip. The RF interface 41b is a circuit for converting the signal received through the antenna 14b into a baseband signal. In addition, the RF interface 41b processes the signal input from the baseband processing circuit 42b using a carrier wave. The baseband processing circuit 42b processes the obtained baseband signal. Furthermore, the baseband processing circuit 42b inputs/outputs data from/to the RF interface 41b and the MAC processing section 43. The MAC processing section 43 performs a wireless media access control such as Carrier Sense Media Access (CSMA). The CPU 60 processes data such as a result of measurement performed by the sensor, using a ROM 61, a RAM 62, a high precision clock 63, and a timer IC 64.

Figure 4:
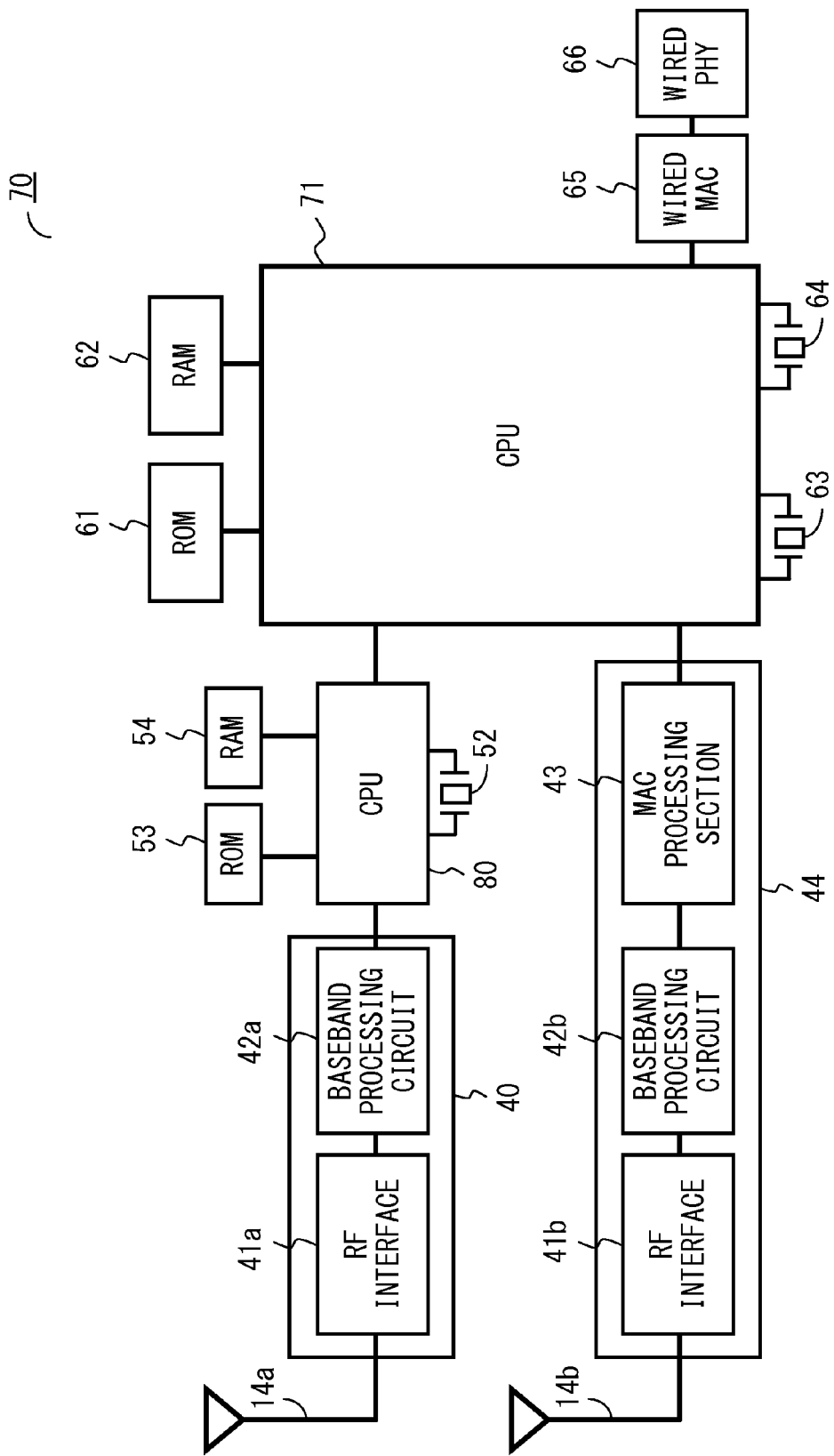
FIG. 4 is a diagram illustrating an example of a configuration of a gateway.

FIG. 4 is a diagram illustrating an example of a configuration of the gateway 70. The gateway 70 includes, as with the node device 10, antennas 14 (14a and 14b), wireless RF circuits 40 and 44, high precision clocks 52 and 63, ROMs 53 and 61, RAMs 54 and 62, and a timer IC 64. The operations of these components are similar to those of the node device 10. The gateway 70 further includes a CPU 71, a CPU 80, a wired MAC processing circuit 65, and a wired PHY (physical layer) chip 66. The CPU 71 measures a timing of transmitting a clock time information frame, and instructs the CPU 80 to transmit the clock time information frame as an interrupt process. In addition, the CPU 71 outputs the clock time information obtained from the NTP server 3 to the CPU 80. The CPU 80 transmits the clock time information frame in a period of time that has been stored in advance as the transmission processing time period, from obtaining the clock time information. Here, it is assumed that the gateway 70 communicates with devices in the network 2, the NTP server 3, and the center server 1 via the wired MAC processing circuit 65 and the wired PHY chip 66. Although the gateway 70 receives the clock time information frame transmitted from the node device 10, the received clock time information frame is not used for correcting the clock time thereof and discarded. The operation of the gateway 70 will be described hereafter in detail.

FIG. 5 is a block diagram on how the node device 10 transmits and receives the clock time information frames. FIG. 5 illustrates processes as functional blocks, which are implemented by the wireless RF circuit 40, the CPU 50, the RAM 54, and the like. A receiver 11, a reception processing section 12, and a transmitter 13 are implemented by the wireless RF circuit 40. A correction timer activating section 21, a data analyzing section 22, a clock time correcting section 24, a clock time measuring section 30, a clock time deviation detecting section 25, a clock time obtaining section 26, and a frame creating section 27 are implemented by the CPU 50. In addition, the μs counter 51 operates as a correction timer 23. The RAM 54 operates as a storage section 28.

The receiver 11, the reception processing section 12, the correction timer activating section 21, the data analyzing section 22, the correction timer 23, the clock time correcting section 24, the storage section 28, and the clock time measuring section 30 operate when the node device 10 receives the clock time information frame. Upon receiving the frame, the receiver 11 requests the correction timer activating section 21 to activate the correction timer 23. The receiver 11 further outputs the received frame to the reception processing section 12. At this point, the receiver 11 performs these processes upon receiving the frame, assuming that the received frame is a clock time information frame. Note that if the data analyzing section 22 determines that the received frame is not a clock time information frame, the clock time synchronization is not performed.

The reception processing section 12 checks the input clock time information frame for errors by means of Cyclic Redundancy Check (CRC). The reception processing section 12 outputs a frame in which no error is detected to the data analyzing section 22, and discards a frame in which an error is detected. The data analyzing section 22 checks whether or not the input frame is a clock time information frame. The data analyzing section 22 further analyzes the clock time information frame to obtain clock time information, and outputs the clock time information to the clock time correcting section 24. The operation of the data analyzing section 22 will be described hereafter in detail.

Meanwhile, the correction timer activating section 21 activates the correction timer 23 in response to the request from the receiver 11. The correction timer 23 measures a period in time from receiving the clock time information frame until outputting the clock time information to the clock time correcting section 24. It is assumed that the storage section 28 stores the transmission processing time period in advance. Note that, in the following description, the term "transmission processing time period" is defined as a period in time from obtaining the clock time information to be set in the clock time information frame by the node device 10 on the transmission side or the gateway 70, until transmitting the clock time information frame containing the clock time information. When the clock time information is input from the data analyzing section 22, the clock time correcting section 24 corrects a clock time measured by the clock time measuring section 30 based on the clock time information, a result of measurement by the correction timer 23, and the transmission processing time period that has been stored in the storage section 28. The result of measurement by the correction timer 23 may be hereafter described as a "reception processing time period."

The clock time measuring section 30 includes an RTC (Real Time Clock) clock time information section 31 and a clock time counter information section 32. The RTC clock time information section 31 measures an absolute clock time. The clock time counter information section 32 measures a clock time as a counter value. The clock time correcting section 24 corrects values of the RTC clock time information section 31 and the clock time counter information section 32 using a sum value of the clock time information, the reception processing time period, and the transmission processing time period. Note that clock time information used at the time of correcting the value of the RTC clock time information section 31 is an absolute clock time, and clock time information used at the time of correcting the value of the clock time counter information section 32 is a counter value.

The clock time deviation detecting section 25, the clock time obtaining section 26, and the frame creating section 27 operate when the node device 10 transmits a clock time information frame. The clock time obtaining section 26 obtains clock time information from the clock time measuring section 30 and outputs the clock time information to the frame creating section 27 to request it to create a clock time information frame. The clock time deviation detecting section 25 detects a possibility that a deviation between a clock time measured by the clock time measuring section 30 and an actual time exceeds a toleration because of a factor such as an overlong interval between the receptions of clock time information frames. Upon detecting a possibility that the deviation in time exceeds the tolerance, the clock time deviation detecting section 25 requests the frame creating section 27 to stop creating a clock time information frame because it is preferable not to notify the other node devices 10 of the clock time information measured by the clock time measuring section 30. Upon receiving the clock time information from the clock time obtaining section 26, the frame creating section 27 creates a clock time information frame if the frame creating section 27 does not receive the request of stopping creating clock time information frame, from the clock time deviation detecting section 25. At this point, the frame creating section 27 adjusts a period of time from obtaining the clock time information until transmitting the clock time information frame to the transmission processing time period. The frame creating section 27 outputs the clock time information frame to the transmitter 13. The transmitter 13 transmits the clock time information frame to the node devices 10 being destinations. Note that all the neighboring nodes are specified as the destinations of the clock time information frame.

On the other hand, if the frame creating section 27 is requested to stop creating a clock time information frame from the clock time deviation detecting section 25, the frame creating section 27 discards the clock time information that is input from the clock time obtaining section 26, and does not create a clock time information frame.

Figure 6:
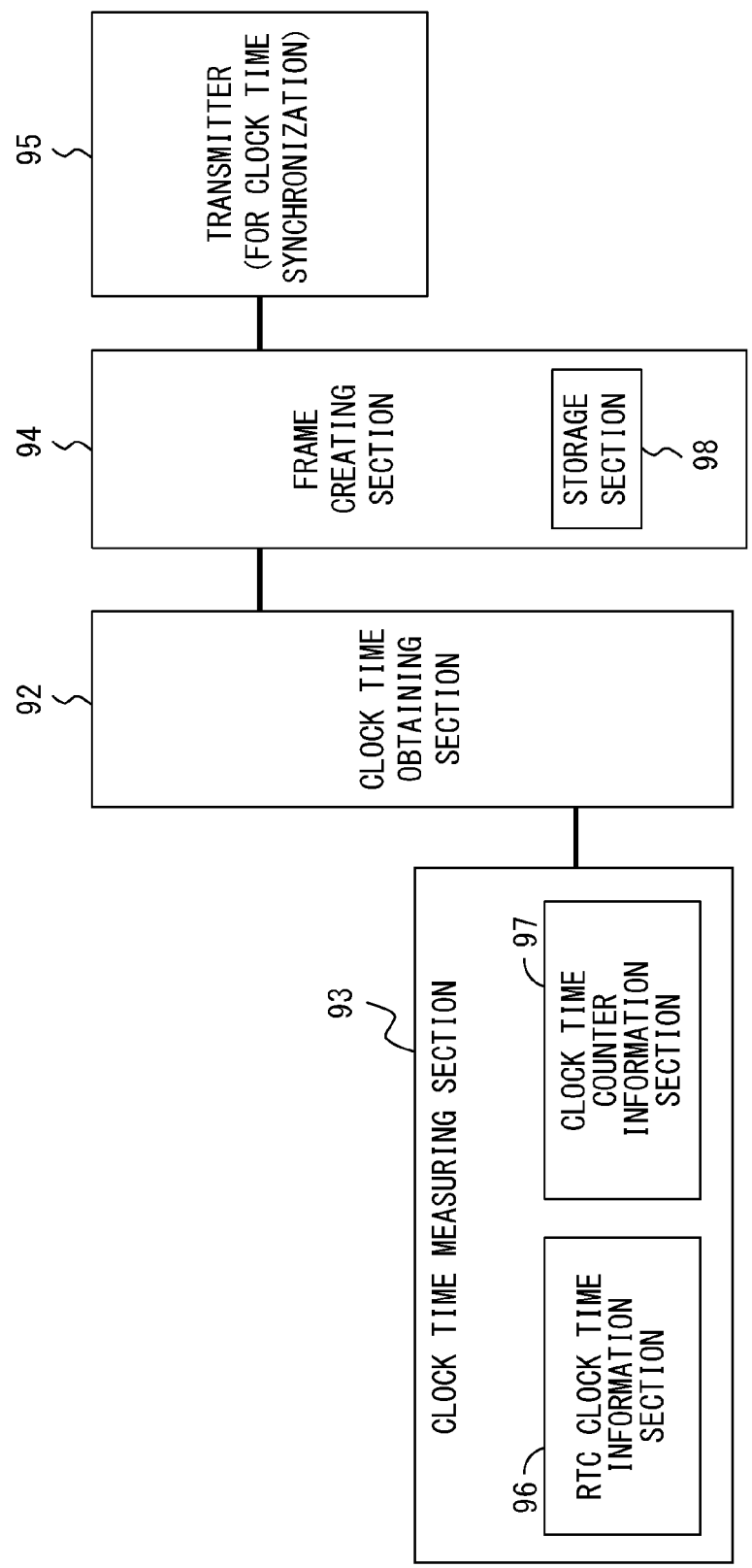
FIG. 6 is a block diagram with respect to transmission of a clock time information frame from the gateway.

FIG. 6 is a block diagram with respect to the transmission of a clock time information frame from the gateway 70. A clock time obtaining section 92 and a frame creating section 94 are implemented by the CPU 80. The RAM 54 operates as a storage section 98. A wireless transmitter 95 is implemented by the RF interface 41a. A clock time measuring section 93 is implemented by the CPU 71. Note that the clock time measuring section 93 includes an RTC clock time information section 96 and a clock time counter information section 97.

The clock time obtaining section 92 obtains clock time information from the CPU 71. At this point, it is assumed that, before the clock time information is obtained, the CPU 71 obtains clock time information representing a current time from the NTP server 3 via the wired MAC processing circuit 65 and the wired PHY chip 66. The RTC clock time information section 96 adjusts a clock time information thereof on the bases of the clock time information that has been obtained from the NTP server 3. In addition, in the clock time counter information section 97, a counter value thereof is changed in accordance with the clock time information that has been obtained from the NTP server 3. The clock time obtaining section 92 outputs the obtained clock time information to the frame creating section 94.

Upon receiving the clock time information from the clock time obtaining section 92, the frame creating section 94 creates a clock time information frame containing the clock time information, and outputs the clock time information frame to the wireless transmitter 95. The wireless transmitter 95 transmits the clock time information frame to all the neighboring node devices 10. At this point, the frame creating section 94 performs a process such that a period of time from a point in time when the clock time obtaining section 92 obtains the clock time information until transmitting the clock time information frame is equal to the transmission processing time period. The transmission processing time period is stored in the storage section 98.

Embodiment

FIG. 7 illustrates an example of a format of a clock time information frame. As illustrated in FIG. 7, the clock time information frame contains a header and clock time information data. The header contains a Local Destination (LD) field, a Local Source (LS) field, a Global Destination (GD) field, and a Global Source (GS) field. In addition, a frame type field, a channel (CH) number field, and a frame size field are also included in the header. In the following description, the "Global Destination" indicates a node device 10 being a final destination of the frame. Meanwhile, the "Local Destination" indicates a node device 10 that is specified as a destination of one hop forward performed for transmitting the frame to the Global Destination. The "Local Source" indicates a node device 10 being a transfer source when the frame is forwarded in one hop. The "Global Source" indicates a node device 10 or the gateway 70 that has created a frame. Since the clock time information frame is broadcasted to neighboring node devices of a node device 10 being a transmission source, the GD and the LD is a broadcast address representing all the neighboring nodes. In addition, the GS and the LS are an address of a node device 10 or the gateway 70 that has created the clock time information frame.

In the frame type field, information indicating a type of data contained in a payload is recorded. In the case of a clock time information frame, a value of the frame type field is set at a value specifying a clock time information frame. The data analyzing section 22 distinguishes clock time information frames from the others using the value of the frame type field. In the channel number field, a value for identifying a channel used for transmission and reception of a clock time information frame is recorded. In the case where a clock time information frame is distinguished from other types of frames using a channel number, the receiver 11 determines whether or not a clock time information frame is received based on a value of the channel number field. In the frame size field, a size of the clock time information frame is recorded.

The clock time information data contains clock time information and a padding. Note that the padding is optional. The clock time information field contains a clock time field, a counter field, a sequence number field, and a hop counter field. In the clock time field, a clock time is recorded which is obtained from the RTC clock time information section 31 by the clock time obtaining section 26 in the node device 10 that creates a clock time information frame, in order to be contained in the clock time information frame. In the case of a clock time information frame created by the gateway 70, a clock time that the gateway 70 obtains from the NTP server 3 is recorded in the clock time field. In the counter field, a counter value that the clock time obtaining section 26 obtains from the clock time counter information section 32 is recorded. In the case of the clock time information frame created by the gateway 70, a counted value that is associated with a clock time obtained from the NTP server 3 by the gateway 70 is recorded in the counter field. In the sequence number field, information is stored which identifies how many times the clock time information frames are transmitted and received for the clock time synchronization. A value of the sequence number field is set by the frame creating section 94 in the gateway 70. The node device 10 does not change the value of the sequence number field, but uses a value contained in the received clock time information frame. In the hop counter field, the number of hops from the gateway is stored. By checking the values of the sequence number field and the hop counter field, the node device 10 discards clock time information frames that are received from the gateway 70 through routes other than a shortest route. In this case, the node device 10 does not correct the clock time thereof. A specific example of the operation will be described hereafter. Note that FIG. 7 is one example of the format of the clock time information frame, and for example, the clock time information frame may be changed such as to contain a CRC field.

FIG. 8 illustrates an example of the transmission of the clock time information frames. As illustrated in FIG. 8, the clock time information frame is transmitted at every transmission cycle T from the gateway 70 to the node device 10 neighboring the gateway 70. The node device 10 that has received the clock time information frame corrects the clock time thereof and thereafter transmits the clock time information frame to the neighboring node devices 10. In such a manner, all the gateway 70 and the node devices 10 included in the ad-hoc network are synchronized in clock time, at every cycle T.

Figure 9A:
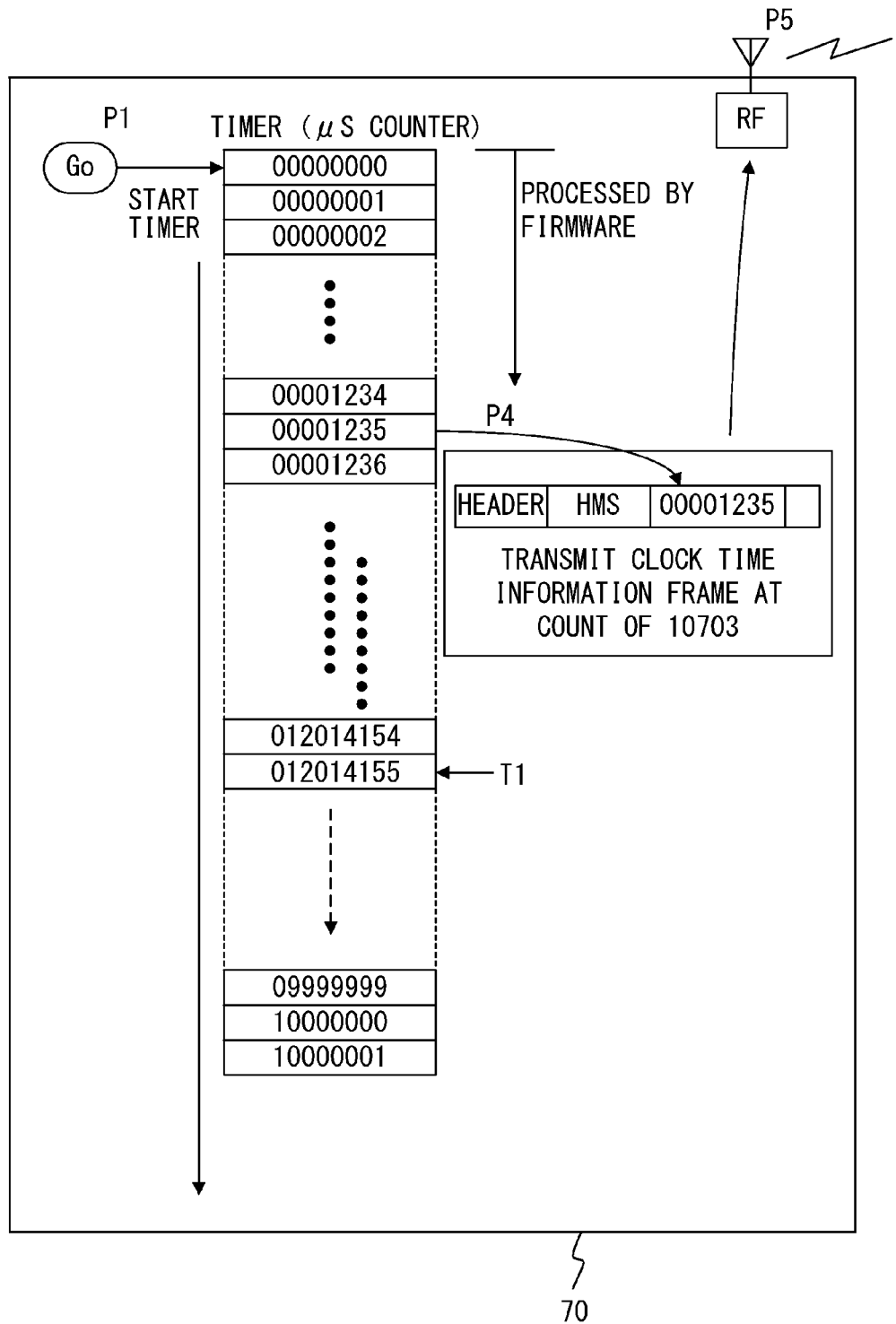
FIGS. 9A and 9B are diagrams illustrating an example of procedures of the clock time synchronization.
Figure 9B:
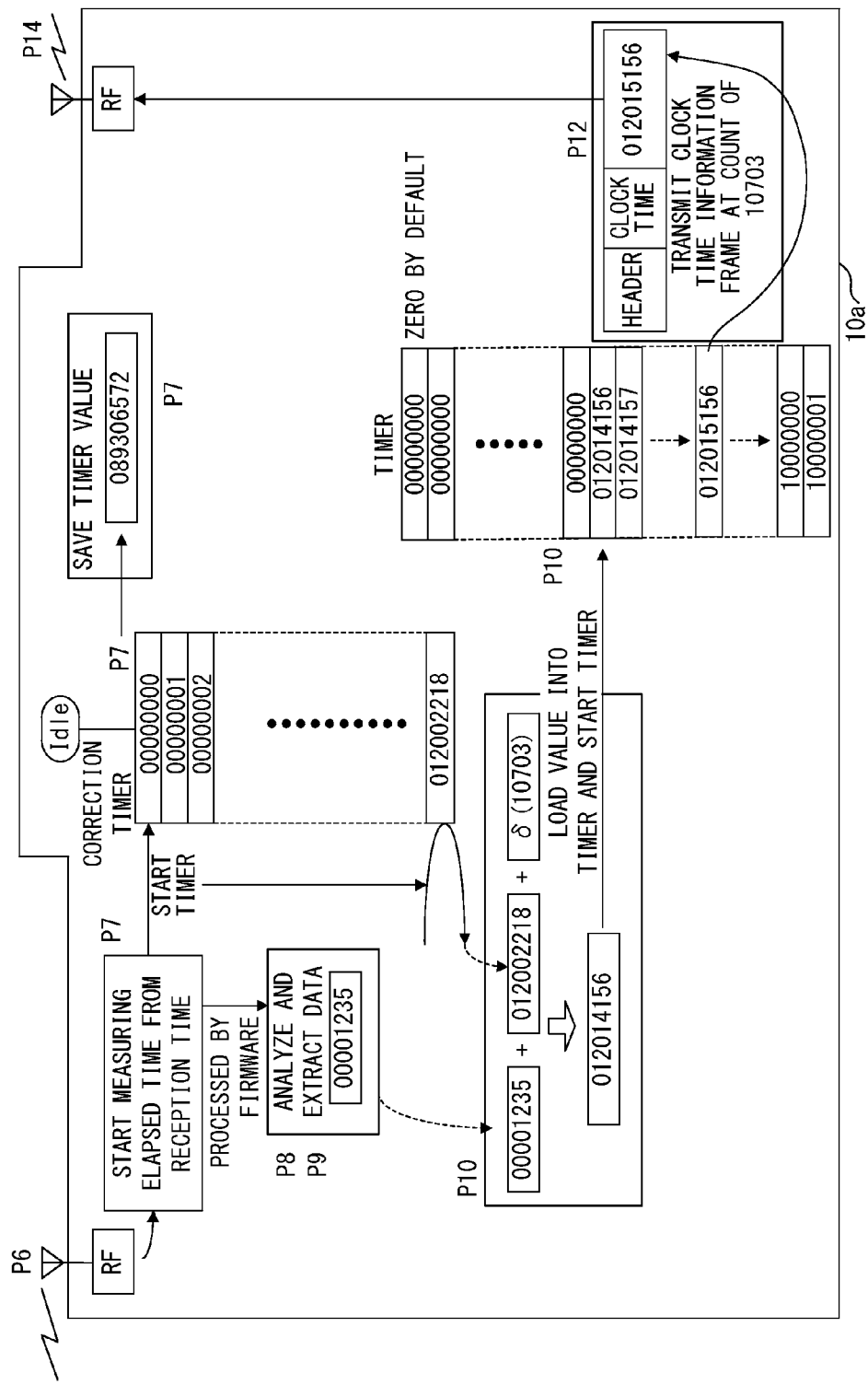

FIGS. 9A and 9B are diagrams illustrating an example of procedures of the clock time synchronization. There will be described below, with reference to FIGS. 9A and 9B, an example of the case where, in the network illustrated in FIG. 2, the node device 10a receives a first clock time information frame transmitted from the gateway 70 to correct the clock time thereof and the node device 10a transmits a second clock time information frame. It is assumed that the node device 10b corrects the time thereof using the second clock time information frame and thereafter transmits a third clock time information frame. Note that combinations of the letters P in the alphabet and numerals in FIGS. 9A and 9B denote numbers of the following procedures.

A procedure P1 is as follows. The CPU 71 of the gateway 70 accesses the NTP server 3 to correct the values of the RTC clock time information section 96 and the clock time counter information section 97.

A procedure P2 is as follows. The CPU 71 calculates a cycle T of the clock time synchronization. The cycle T of the clock time synchronization is a cycle at which deviations in time can be suppressed within a tolerance among all the node devices 10 and the gateway 70 included in the ad-hoc network. Differences among pieces of clock time data of the node devices 10 disadvantageously occur due to deviation of a frequency on which the node device 10 operates, or a task processed in the CPUs installed in the node device 10. The process for the clock time synchronization is, however, performed by the CPU 50 in the node device 10 and by the CPU 80 in the gateway 70, and therefore the deviation in clock time due to the influence of the task can be ignored. Thus, the CPU 71 determines a cycle of the clock time synchronization such that magnitudes of the deviations in clock time that occur due to the deviations of the frequencies on which the individual node devices 10 operate do not exceed the tolerance. For example, in the case of using a clock whose oscillating frequency is 20 MHz±0.5 ppm (parts per million), a difference of 0.05 μs can occur in one second. Supposing that the difference of 0.05 μs occurs in one second, a period of time for which the differences sum up to 250 μs is calculated as, $$250(\mu s)/0.05(\mu s/s) = 5000$$

and it thus takes 5000 seconds. Therefore, in order to suppress an error range within 250 μs or less in the case of the oscillating frequency of 20 MHz±0.5 ppm, the clock time may be synchronized at a frequency at least once every 5000 seconds.

Here, since the node devices 10 and the gateway 70 do not perform a media address control at the time of transmitting the clock time information frame, it is preferable to set the cycle T such that the deviation in clock time does not exceed the tolerance even if a collision occurs. Thus, the CPU 71 can calculate the cycle T using the following expression.

$$T=E/(e \times N)$$

Here, T denotes a cycle to perform the clock time synchronization, E denotes a tolerance of clock time error, e denotes a magnitude of an error that can occur in one second, and N denotes the number of the clock time synchronizations that are performed in a period of time within which a clock time error is expected to fall within the tolerance.

A procedure P3 is as follows. The CPU 71 sets the cycle T calculated in the procedure P2 to the timer IC 64. Upon receiving a notification of a lapse of the cycle T from the timer IC 64, the CPU 71 requests the clock time obtaining section 92 in the CPU 80 to obtain clock time information.

Upon receiving the request from the CPU 71, the CPU 80 predicts that the clock time synchronization is to be performed and sets an interrupt mask so as not to perform an interrupt process. Furthermore, the frame creating section 94 creates a clock time information frame that contains the number of hops and the sequence number but does not contain information such as clock time information and an address. At this point, the number of hops is set at one so as to make the gateway 70 a starting point. The sequence number is a sequential number in a creation order of the clock time information frames. For example, if the first clock time information frame is a clock time information frame created for a second time since the CPU 80 is initialized, the sequence number is set at two.

A procedure P4 is as follows. The clock time obtaining section 92 obtains the clock time information from the RTC clock time information section 96 and the clock time counter information section 97. The clock time obtaining section 92 outputs the obtained clock time information to the frame creating section 94. The frame creating section 94 reads out the transmission processing time period from the storage section 98, creates the first clock time information frame and outputs it to the wireless transmitter 95 such that the first clock time information frame is transmitted at a point in time when the transmission processing time period elapses from obtaining the clock time information. In the example of FIG. 9A, it is assumed that the transmission processing time period is a count of 10703. The frame creating section 94 performs processes such as setting the destination addresses (GD and LD) and the source addresses (GS and LS), and setting the clock time information to the clock time information data, during the transmission processing time period.

A procedure P5 is as follows. The wireless transmitter 95 transmits the first clock time information frame to the neighboring node devices 10. In addition, the wireless transmitter 95 causes the CPU 80 to clear the interrupt mask, which allows the CPU 80 to perform an interrupt process.

In a procedure P6, the receiver 11 of the node device 10a receives the first clock time information frame.

A procedure P7 is as follows. The receiver 11 notifies the correction timer activating section 21 of the reception of the clock time information frame. In addition, the receiver 11 outputs the first clock time information frame to the reception processing section 12. The correction timer activating section 21 activates the correction timer 23, and the correction timer 23 starts measuring an elapsed time from the point in time of starting receiving the first clock time information frame. The correction timer 23 counts the elapsed time using the μs counter 51. Note that if the node device 10a has already received the clock time information frame before the correction timer 23 is activated, the counting has been started by the μs counter 51. In this case, the correction timer 23 saves the counter value of the μs counter 51 to the RAM 54. In the example of FIG. 9B, the node device 10a has already received the clock time information frame, and the value of the μs counter 51 is 089306572. Hence, the correction timer 23 records the counter value of 089306572 in the RAM 54. After the saving of the data, the correction timer 23 resets the counter value of the μs counter 51 at 0, and starts measuring the reception processing time period.

A procedure P8 is as follows. The reception processing section 12 checks the input frame for errors, and outputs a frame in which no error is detected to the data analyzing section 22. Here, it is assumed that the first clock time information frame is output to the data analyzing section 22.

A procedure P9 is as follows. The data analyzing section 22 checks whether or not the value of the frame type field is a value representing a clock time information frame. Upon checking that the input frame is a clock time information frame, on the basis of the value of the frame type field, the data analyzing section 22 determines whether to perform the clock time synchronization using the clock time information frame. The data analyzing section 22 stores a maximum value of the sequence numbers of the clock time information frames that have been processed, and determines that a clock time information frame having a sequence number greater than the maximum value can be used for the clock time synchronization. For example, when a clock time information frame having a sequence number of two is input in the case where the maximum value of the sequence numbers is one, the data analyzing section 22 uses the input clock time information frame for the clock time synchronization with determination that the received clock time information frame is created after previous processing of the clock time information frame. On the other hand, when a clock time information frame having a sequence number of one is input in the case where the maximum value of the sequence numbers is one, the data analyzing section 22 discards the input clock time information frame with determination that the received frame is based on the clock time information frame that has been already processed. The data analyzing section 22 can further determine whether to discard a frame, using the number of hops. In this case, the data analyzing section 22 stores an upper limit value of the number of hops in advance, and discards a clock time information frame having the number of hops exceeding the upper limit value.

If the input clock time information frame is a frame that is not used for the clock time synchronization, the data analyzing section 22 does not extract clock time information but notifies the clock time correcting section 24 of the reception of the frame that is not used for the clock time synchronization. Then, the clock time correcting section 24 inputs a value obtained by adding the counted value of the correction timer 23 to the counted value saved in the RAM 54, to the clock time counter information section 32. That is, the clock time correcting section 24 does not perform the clock time correction.

If the input clock time information frame is a frame that can be used for the clock time synchronization, the data analyzing section 22 obtains clock time information and outputs it to the clock time correcting section 24. In the example of FIG. 9B, a value of the counter field (00001235) is obtained as the clock time information.

A procedure P10 is as follows. Upon receiving the clock time information from the data analyzing section 22, the clock time correcting section 24 obtains the reception processing time period from the correction timer 23. In the example of FIG. 9B, the counted value (012002218) of the correction timer 23 is obtained as the reception processing time period, from a point in time when the first clock time information frame is received until a point in time when the clock time information is output to the clock time correcting section 24. Note that the storage section 28 stores the transmission processing time period of the count of 10703. Hence, the clock time correcting section 24 calculates a value to be set to the clock time counter information section 32, from the following expression.

$$\alpha+\beta+\gamma=(00001235)+(012002218)+(10703)=(012014156)$$

Here, $\alpha$ denotes the clock time information, $\beta$ denotes the transmission processing time period, and $\gamma$ denotes the reception processing time period. The clock time correcting section 24 changes the counter value of the clock time counter information section 32 to the obtained value. In addition, the clock time correcting section 24 can change a value of the RTC clock time information section 31 in accordance with the changing of the value of the clock time counter information section 32.

A procedure P11 is as follows. When the value of the clock time counter information section 32 of the node device 10a is set, the node device 10a starts creating the second clock time information frame. The frame creating section 27 creates a clock time information frame that contains the number of hops and the sequence number but does not contain clock time information or address information. At this point, the number of hops is set at a value obtained by incrementing the number of hops of the first clock time information frame by one so as to make the gateway 70 a starting point. The sequence number is set at the sequence number of the first clock time information frame. Therefore, at this point, the frame creating section 27 of the node device 10a performs settings such that the number of hops=2 and the sequence number=2. The clock time obtaining section 26 obtains the counter value of the clock time counter information section 32 after the lapse of a waiting time that is determined at random. The clock time obtaining section 26 further obtains the clock time information of the RTC clock time information section 31. Here, it is assumed that the counter value obtained by the clock time obtaining section 26 is 012015156.

A procedure P12 is as follows. The clock time obtaining section 26 outputs the obtained clock time information to the frame creating section 27. The frame creating section 27 sets the clock time information input from the clock time obtaining section 26 and the address information to the second clock time information frame to complete it. Note that the frame creating section 27 performs the process such that the second clock time information frame is transmitted at a point in time when the transmission processing time period elapses from the point in time when the clock time obtaining section 26 obtains the clock time information.

A procedure P13 is as follows. The clock time deviation detecting section 25 monitors whether or not the clock time correcting section 24 has performed the correction using the clock time information frame. The clock time deviation detecting section 25 further counts a period of time that elapses from a point in time when the value of the clock time counter information section 32 is last corrected. The clock time deviation detecting section 25 stores an upper limit value in advance, and requests the frame creating section 27 to stop creating the clock time information frame when the counted value exceeds the upper limit value. Note that, in the example of FIG. 9B, it is assumed that the creation of the clock time information frame is not stopped because the value of the clock time counter information section 32 is corrected in the procedure P10.

A procedure P14 is as follows. The node device 10a transmits the second clock time information frame in a broadcasting manner. It is assumed that the node device 10b transmits the third clock time information frame after correcting the clock time thereof using the second clock time information frame.

In the example of FIGS. 9A and 9B, the counted value of the clock time counter information section 32 of the node device 10a is corrected to 012014156 at a point in time T1, whereas the counted value of the clock time counter information section 97 in the gateway 70 at the point in time T1 is 012014155. Therefore, it can be said that the node device 10a is synchronized with the gateway 70 in clock time with high precision based on the first clock time information frame broadcasted from the gateway 70. Furthermore, since the second clock time information frame broadcasted by the node device 10a is processed by the node device 10b in a similar manner as the reception process of the clock time information frame performed by the node device 10a, the node device 10a and the node device 10b are also synchronized in clock time with high precision. Likewise, clock time information frames are transmitted and received among the node devices 10 included in the ad-hoc network to perform the clock time synchronization using three pieces of information, that is, the transmission processing time period, the reception processing time period, and the clock time information. Therefore, in the present embodiment, the reception processing time period measured by the node device 10 on the reception side and the transmission processing time period set at a fixed value are used together with the clock time information for the clock time correction, which allows the node devices 10 included in the ad-hoc network to be synchronized in clock time with high precision.

Figure 10:
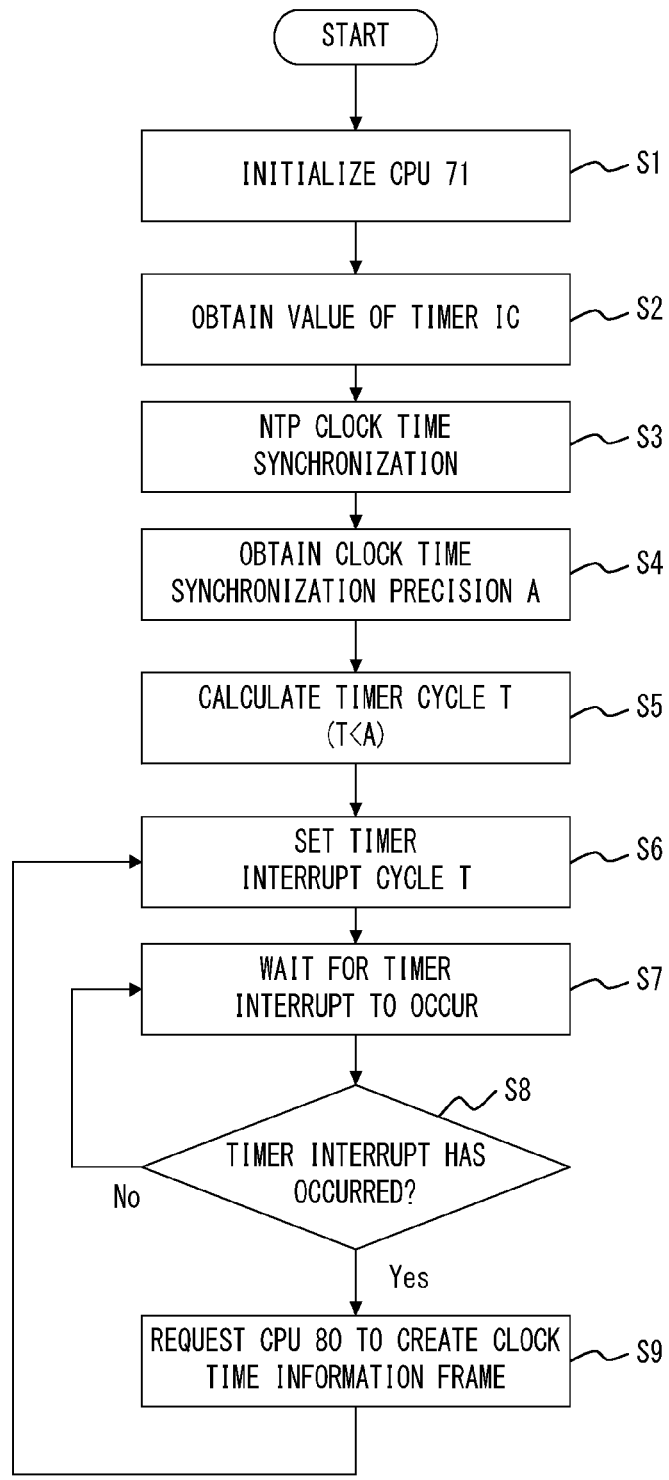
FIG. 10 is a flowchart illustrating an example of an operation of a CPU 71.

FIG. 10 is a flowchart illustrating an example of an operation of the CPU 71. When the gateway 70 is activated, the CPU 71 is initialized (step S1), the CPU 71 obtains a current clock time from the timer IC 64 (step S2). For example, it is assumed that a clock time obtained from the timer IC 64 is 2011/10/28 19:00:10. Next, the CPU 71 synchronizes the clock time with the NTP server 3 using the NTP, and sets the obtained clock time as the latest clock time (step S3). For example, if the obtained clock time is 2011/10/28 19:01:10:123, the CPU 71 changes the current clock time from 2011/10/28 19:00:10 to 2011/10/28 19:01:10:123. The CPU 71 calculates a clock time synchronization precision A (step S4). Here, A=E/e, where E denotes a tolerance of a clock time error, and e denotes a magnitude of an error that can occur in one second. The CPU 71 calculates a timer cycle by dividing the clock time synchronization precision A by the number of the clock time synchronizations that are performed within a period of time for which the clock time error is expected to fall within the tolerance (step S5). The CPU 71 sets the cycle T to the timer, as a cycle to transmit the clock time information frame (step S6). The CPU 71 waits for a timer interrupt that is generated at every cycle T (step S7). When the interrupt occurs, the CPU 71 requests the CPU 80 to start creating the clock time information frame (step S8). After the request of creating the clock time information frame is made, the processes of steps S6 through S9 are repeated.

Figure 11:
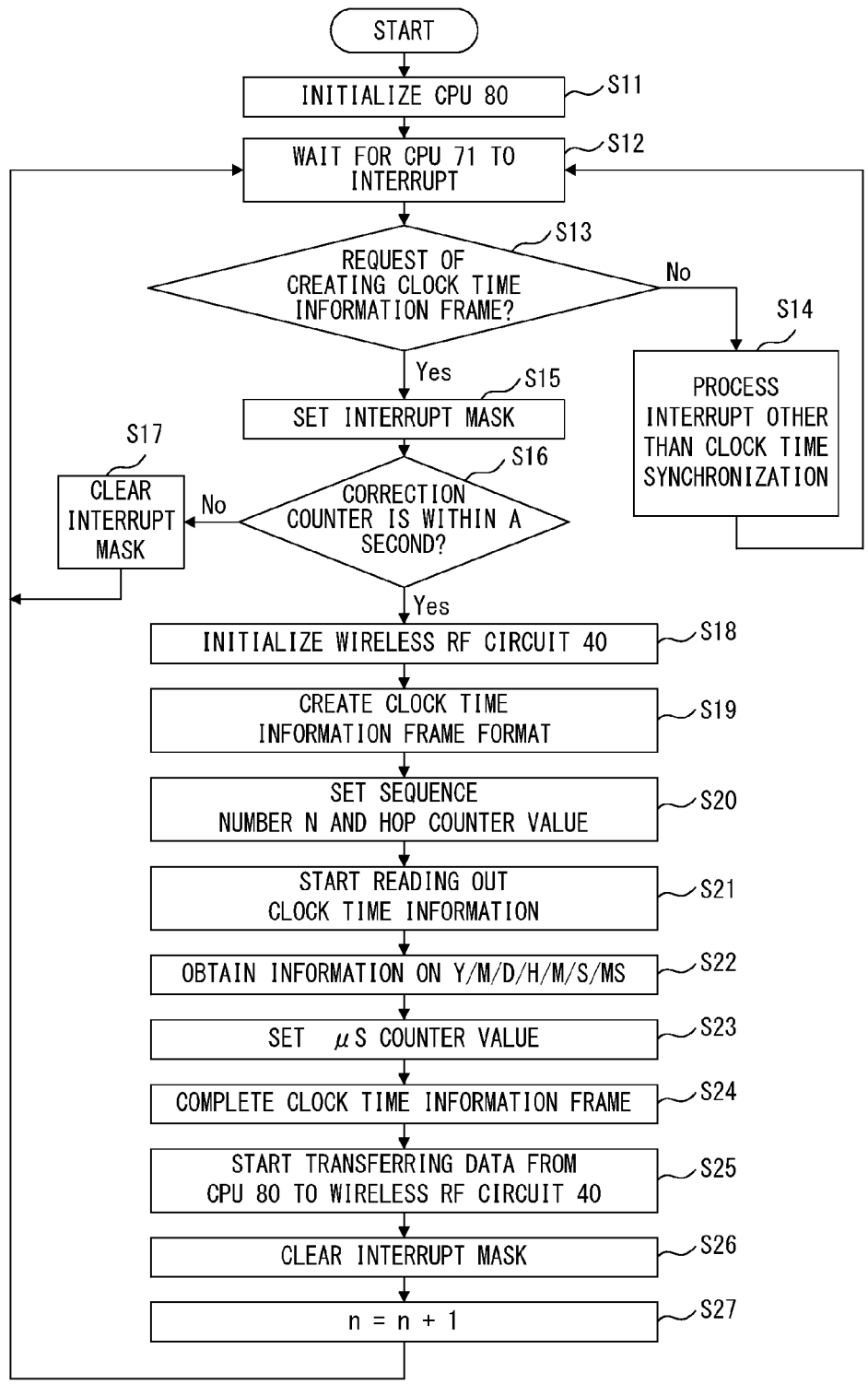
FIG. 11 is a flowchart illustrating an example of an operation of a CPU 80.

FIG. 11 is a flowchart illustrating an example of an operation of the CPU 80. Note that FIG. 11 is one example of the operation, and a change may be added such as changing the order of step S22 and step S23, depending on implementations.

The CPU 80 performs setting such as the sequence number (n)=1 and a counter value of the μs counter=0 by initializing the counter value (step S11). The CPU 80 waits for an interrupt process from the CPU 71 (step S12). Upon receiving the request of the interrupt process, the CPU 80 checks whether or not creating the clock time information frame is requested from the CPU 71 (step S13). If the interrupt process is not one to create the clock time information frame, the CPU 80 performs the requested interrupt process, and the flow thereafter returns to step S12 (No at step S13, then step S14). When the creating the clock time information frame is requested, the CPU 80 sets the interrupt mask so as not to accept another interrupt process (Yes at step S13, then step S15). The CPU 80 measures an interval at which the CPU 71 requests the creating the clock time information frame, using the correction counter. If the counter value of the correction counter is greater than the clock time synchronization precision A, the CPU 80 determines that a malfunction has occurred, clears the interrupt mask, and the flow returns to step S12 (No at step S16, then step S17). On the other hand, if the counter value of the correction counter is equal to or less than the clock time synchronization precision A, the CPU 80 performs initialization and setting of the wireless RF circuit 40 used for the clock time synchronization (step S18). The CPU 80 creates a clock time information frame format (step S19). The frame creating section 94 sets the Hop counter value=1 to the hop counter field of the clock time synchronization frame, and the sequence number n (step S20). The clock time obtaining section 92 obtains the clock time that the CPU 71 obtains in step S3 (step S21). The frame creating section 94 sets year, month, day, hour, minute, and second of the clock time obtained by the clock time obtaining section 92 down to milliseconds, in four bytes to the clock time field of the clock time information frame (step S22). The frame creating section 94 sets the value of the μs counter to the counter field of the clock time information frame (step S23). The frame creating section 94 sets the address that has been allocated to the gateway 70 to the GS field and the LS field, and sets a broadcast address (0xFFFFFFFFFFFF) to the GD field to the LD field. The frame creating section 94 further sets the size of the frame and the like to the clock time information frame to complete it (step S24). The frame creating section 94 outputs the frame created in step S24 to the wireless RF circuit 40, and clears the interrupt mask (steps S25 and S26). The frame creating section 94 further increments the sequence number n by one and the flow returns to step S12 (step S27).

Figure 12:
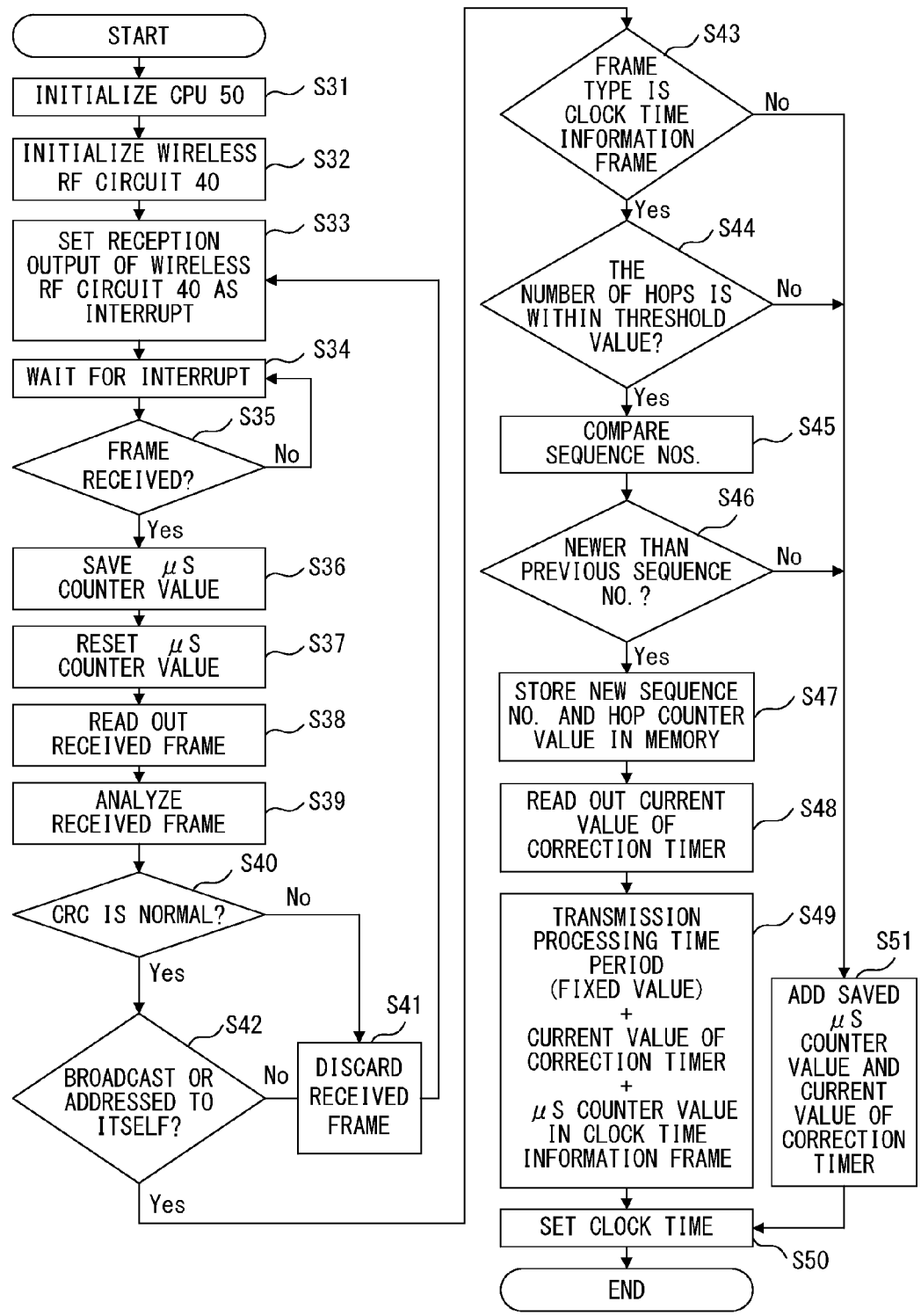
FIG. 12 is a flowchart illustrating an example of an operation of the node device upon receiving the clock time information frame.

FIG. 12 is a flowchart illustrating an example of an operation of the node device 10 upon receiving the clock time information frame. Note that, in the example of FIG. 12, unlike the case described with reference to FIGS. 9A and 9B, there will be described the case where the data analyzing section 22 performs a CRC check, but the CRC check and the like may be performed by the reception processing section 12. In addition, the determination order of step S40 and S42 may be changed. Furthermore, step S42 may be omitted depending on embodiments or a processing capacity of the node device 10. The determination order of step S43, S44, and S46 may be changed depending on implementations.

At the time of activating the node device 10, the CPU 50 is initialized (step S31). At this point, the data analyzing section 22 sets the maximum number of the sequence number contained in the received clock time information frame at zero, and also initializes the data on a record of the number of hops to zero. In addition, the data analyzing section 22 performs the settings, the calculation, and the like of the upper limit value of the number of hops, and the clock time synchronization precision A. In the following description, it is assumed that the upper limit of the number of hops has been read out by the data analyzing section 22 from the ROM 53 at the time of the initialization, and the number of hops=20. Next, the node device 10 initializes the wireless RF circuit 40 (step S32). The correction timer activating section 21 and the data analyzing section 22 each set an interrupt whose trigger is reception of a frame by the receiver 11 (step S33). The node device 10 waits for the wireless RF circuit 40 to receive the frame (step S34). When the receiver 11 receives a frame, the correction timer activating section 21 activates the correction timer 23. The correction timer 23 saves and resets the counter value (the counter value of the μs counter 51) (steps S35 through S37). The correction timer 23 restarts counting after the resetting so as to start measuring the reception processing time period. The data analyzing section 22 develops the received frame in the memory and analyzes it (steps S38 and S39). The data analyzing section 22 checks the CRC thereof, and discards the frame and the flow returns to step S33 if an anomaly is found, (No at step S40, then step S41). If the result of checking the CRC is normal, the data analyzing section 22 checks a destination address of the frame to see whether the frame is a frame addressed to itself or a broadcast frame (step S42). If the frame is neither a frame addressed to itself nor a broadcast frame, the data analyzing section 22 discards the frame and the flow returns to step S33 (No at step S42, then S41). On the other hand, if the frame is either a frame addressed to itself or a broadcast frame, the data analyzing section 22 checks a value of the frame type field (step S43). Upon confirming that the frame is a clock time information frame on the basis of the value of the frame type field, the data analyzing section 22 checks whether or not the number of hops is equal to or less than the upper limit value (Yes at step S43, then step S44). If the number of hops is equal to or less than the upper limit value, the data analyzing section 22 reads out a value of the sequence number field, and compares it with the maximum value of the sequence numbers of the clock time information frames that have been thus far processed (step S45). At this point, if the read out sequence number is greater than the maximum number of the sequence numbers of the processed frames, the data analyzing section 22 determines that the clock time information frame being analyzed can be used for the clock time correction, and stores the sequence number and the hop counter value in the RAM 54 (Yes at step S46, then step S47). Furthermore, the data analyzing section 22 extracts clock time information from the clock time information frame and outputs it to the clock time correcting section 24. The clock time correcting section 24 reads out the current value of the correction timer 23 to calculate the reception processing time period (step S48). The clock time correcting section 24 sets a value obtained by adding the reception processing time period and the transmission processing time period that is stored as a fixed value, to the clock time information obtained from the clock time information frame, as the corrected value. If the clock time information is a counter value, the clock time correcting section 24 calculates a sum of a counter number equivalent to the transmission processing time period, the counted value of the correction timer 23, and the value of the counter field of the clock time information frame (step S49). The clock time correcting section 24 sets the obtained counter value to the clock time counter information section 32 to set the clock time information frame (step S50). In addition, the clock time correcting section 24 also corrects the value of the RTC clock time information section 31 in accordance with the amount of change made to the value of clock time counter information section 32. On the other hand, if the determination is "No" in any one of steps S43, S44, and S46, the clock time correcting section 24 sets a value obtained by adding a current value of the correction timer 23 to the counter value that has been saved in step S36, to the µs counter 51 (steps S51 and S50).

FIG. 13 is a flowchart illustrating an example of an operation of the node device 10 at the time of transmitting a clock time information frame. Note that step S64 can be optional. At the time of starting creating the clock time information frame, the clock time obtaining section 26 sets an interrupt mask of the CPU 50 to avoid unexpected delays due to another process (step S61). The frame creating section 27 creates a clock time information frame that does not contain any information on the fields (step S62). The frame creating section 27 sets a value obtained by incrementing the number of hops stored in the RAM 54 by one to the value of the hop counter field, and sets the sequence number stored in the RAM 54 to the sequence number field (step S63). Note that the values of the number of hops and the sequence number used in step S63 are those that have been stored in step S47 of FIG. 12. The node device 10 waits a random period of time to obtain a clock time so as to avoid transmitting the clock time information frame at the same timing with the other node devices 10 if the node device 10 receives a clock time information frame simultaneously with the other node devices 10. For example, the clock time obtaining section 26 generates a random value ranging from 0 to 1000, and waits a period of time corresponding to the obtained random value (step S64).

When the waiting time elapses, the clock time obtaining section 26 reads out a year, month, day, hour, minute, second, and millisecond of a current clock time from the RTC clock time information section 31, and further reads out the counter value of the clock time counter information section 32 (steps S65 through S67). The clock time obtaining section 26 outputs the obtained clock time information to the frame creating section 27, and the frame creating section 27 records the input clock time information in the clock time field and the counter field of the clock time information frame (step S68). The frame creating section 27 sets the values of the address information, the size of the frame, and the like, to complete the clock time information frame (step S69). The clock time deviation detecting section 25 measures a period of time that elapses from a point in time when the values of the RTC clock time information section 31 and the clock time counter information section 32 are last corrected, and requests the frame creating section 27 to stop creating the clock time information frame if the elapsed time exceeds the clock time synchronization precision A. The frame creating section 27 checks whether or not the clock time deviation detecting section 25 has requested the stopping creating the clock time information frame, before outputting the created frame to the transmitter 13 (step S70). If the request of the stopping creating the clock time information frame has not been made, the frame creating section 27 transmits the clock time information frame via the transmitter 13 (No at step S70, then step S71). The frame creating section 27 clears the interrupt mask of the CPU 50 (step S72). On the other hand, if it is checked that the request of the stopping creating the clock time information frame has been made in step S70, the frame creating section 27 discards the clock time information frame and clears the interrupt mask of the CPU 50 (Yes at step S70, then step S72). Note that the processes from steps S65 until S71 are processed for the predetermined transmission processing time period.

Factors of an error of the clock time synchronization include (a) fluctuations due to propagation delay, (b) an error occurring due to distortion of a received signal, (c) an error occurring through calculation processes, and (d) fluctuations of delay due to the wireless media access control. In the node device 10 and the gateway 70, the CPUs 50 and 80 for creating the clock time information frames are separated from the CPUs 60 and 71 for performing the other processes, and furthermore, during the transmission process of the clock time information frame, interrupt processes performed in the CPUs 50 and 80 are masked. It is therefore possible to get rid of errors that occur through the calculation processes in the process from obtaining the clock time information until transmitting the clock time information frame, and to set a total machine cycle to a fixed value (the transmission processing time period). Furthermore, also as illustrated in FIG. 1, the node device 10 that has received the clock time information frame measures a period of time from starting receiving the frame until obtaining the clock time information in the clock time information frame, as the reception processing time period. Since the node device 10 corrects the clock time using the value obtained by adding the transmission processing time period and the reception processing time period to the clock time information, no error occurs through the calculation processes between a transmission source of the clock time information frame and the node device 10 being a reception destination.

Furthermore, neither the gateway 70 nor the node devices 10 perform the wireless media access control such as CSMA. Therefore, a waiting time that is unknowable for the CPU 50 or the CPU 80 does not come out, the waiting time such as to avoid collision in the case where a plurality of clock time information frames are simultaneously transmitted. Thus, in the network using the node devices 10 and the gateway 70, the fluctuations of delay due to the wireless media access control do not also arise.

Even in the network using the node devices 10 and the gateway 70, it is impossible to predict an error occurring due to the fluctuations of propagation delay and the distortions of a received signal. However, the error occurring due to the fluctuations of propagation delay and the distortions of a received signal is very small as compared with the magnitude of the clock time error occurring due to the other factors, and therefore can be ignored. For this reason, in the network using the node devices 10 and the gateway 70, the clock time synchronization can be performed with high precision.

In addition, as illustrated in FIG. 3, FIG. 4, and the like, both the node devices 10 and the gateway 70 can be manufactured by assembling general-purpose components. For this reason, the node devices 10 and the gateway 70 have a high compatibility to other devices, as compared with devices using customized hardware. Furthermore, since the general-purpose components can be used, a manufacturing cost can be reduced, and a manufacturing time can be reduced by a period of time taken for customizing the hardware.

Furthermore, in the method for synchronizing clock times performed in the network using the node devices 10 and the gateway 70, unlike a calculation method such as the RBS, the number of the node devices 10 included in the ad-hoc network has no influence on the calculations. For this reason, the node devices 10 and the gateway 70 can be used for forming a large-scale ad-hoc network. In addition, since frames other than the clock time information frames are not transmitted and received for the clock time synchronization, power consumed for the clock time synchronization in both the node devices 10 and the gateway 70 can be suppressed as compared with devices that perform the clock time synchronization using the GPS or the TPSN.

As described above, using the node device and the method according to the embodiment allows the clock time synchronization among the node devices included in the network to be simply performed with high precision.

Other Considerations

Note that embodiments are not limited to the above and can be variously modified. Some examples thereof will be described below.

Figure 14:
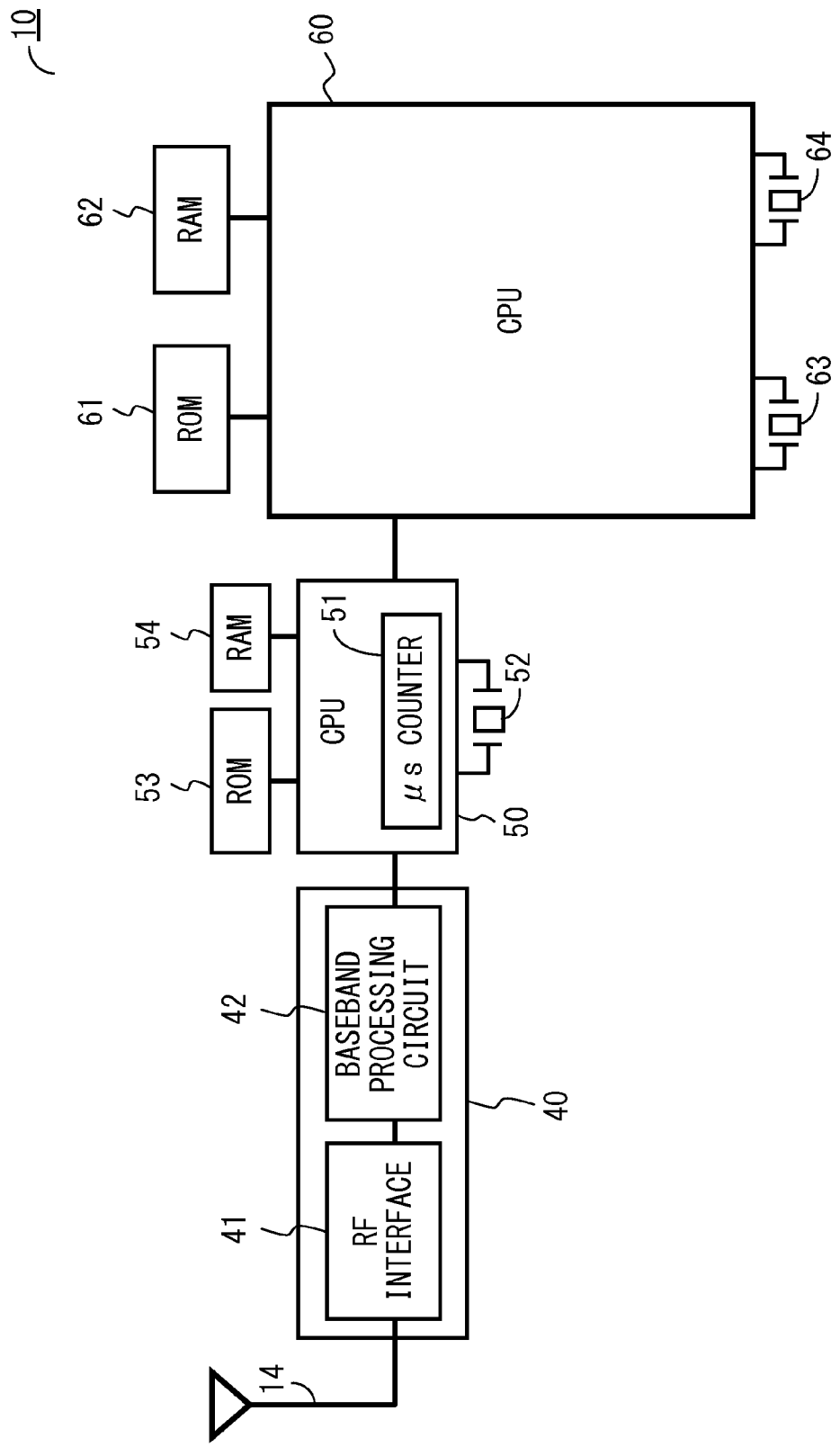
FIG. 14 is a diagram illustrating an example of a configuration of the node device.

FIG. 14 illustrates a modification of a hardware configuration of a node device 10. In the example of FIG. 14, the node device 10 includes an antenna 14, and both a clock time information frame and other data are transmitted from the antenna 14. In this case, since a CPU 50 prohibits an interrupt during a period of time from creating the clock time information frame until finishing transmission of the clock time information frame, frames other than the clock time information frame are not transmitted. Therefore, transmission of data from the node device 10 to the center server 1 may be delayed as compared with the system using the node devices 10 illustrated in FIG. 3. The node device 10 does not however need to include the plurality of antennas 14 and the wireless RF circuit 44, which allows the size of the node device 10 to be reduced, and allows the manufacturing cost of the node device 10 to be reduced.

The frame format of the clock time information frame illustrated in FIG. 7 is one example, and the information elements contained in the clock time information frame may be changed depending on implementations. For example, although there has been described the embodiment, by way of example, as the case where both the clock time field and the counter field are contained in the clock time information data, the clock time information frame may be modified to contain any one of the clock time field and the counter field. In this case, any one of the absolute clock time and the counter value is used for calculating a corrected value of a clock time.

FIG. 3 and FIG. 4 are the examples of the hardware configurations of the node device 10 and the gateway 70, which may be changed depending on implementations. For example, any number of flash memories may be connected to at least any one of the CPU 50, the CPU 60, the CPU 71, and the CPU 80.

Although there has been described above the case, by way of example, where the RTC clock time information section 31 and the clock time counter information section 32 of the node device 10 are implemented by the CPU 50, the RTC clock time information section 31 and the clock time counter information section 32 may be included in the CPU 60. In this case, at the time of obtaining the clock time, the clock time obtaining section 26 accesses the CPU 60 to obtain the clock time information from the RTC clock time information section 31 and the clock time counter information section 32. Likewise, the RTC clock time information section 96 and the clock time counter information section 97 may be included in the CPU 80, or may be included in the CPU 71.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the invention have been described in detail, it should be understood that the various changes, substitutions, and alterations could be made hereto without departing from the spirit and scope of the invention.

What is claimed is:

1. A node device comprising:
a processor configured to measure a clock time;
a wireless RF circuit configured to receive a clock time information frame, which is a frame that contains clock time information used for correcting the clock time;
a memory configured to store a transmission processing time period, as a fixed value, from a point in time when a transmission source node device of the clock time information frame obtains the clock time information until a point in time when the transmission source node device transmits the clock time information frame; and
a timer configured to measure a reception processing time period, which is a period of time from a point in time when the clock time information frame is received until a point in time where the clock time information is obtained from the clock time information frame, wherein
the node device sets to the processor a value obtained by adding the fixed value and the reception processing time period to the clock time information so as to correct a clock time measured by the processor.

2. The node device according to claim 1, wherein
the processor, after correcting the clock time using clock time information contained in the clock time information frame that is received by the wireless RF circuit,
obtains other clock time information that represents the clock time measured by the processor,
creates a clock time information frame that contains the other clock time information such that the clock time information frame is transmitted at a point in time when a period of time represented by the fixed value elapses from a point in time when the processor obtains the clock time information, and
the wireless RF circuit transmits a clock time information frame that contains the other clock time information.

3. The node device according to claim 2, further comprising:
a sensor configured to measure a physical quantity;
another wireless RF circuit that are different from the wireless RF circuit; and
another processor different from the processor, wherein
the another processor processes the physical quantity measured by the sensor, and
the another wireless RF circuit transmits and receives data processed by the another processor.

4. The node device according to claim 2, wherein
the processor
measures an elapsed time that is a period of time elapsed from correcting the clock time, and
upon detecting that the elapsed time exceeds a threshold value determined as a function of a magnitude of an error allowed in a network, stops creating a clock time information frame containing the other clock time information.

5. A node device comprising:
a first processing circuit;
a second processing circuit configured to request the first processing circuit to create a clock time information frame containing clock time information at every correction cycle, the correction cycle being a cycle for correcting a clock time;
a memory configured to store a fixed value that a destination node device of the clock time information frame stores in advance, as a period of time from a point in time when the first processing circuit obtains the clock time information until a point in time when the first processing circuit transmits the clock time information frame; and a transmitter configured to transmit the clock time information frame to the destination node device, wherein the first processing circuit
- prohibits an interrupt process upon receiving the request of creating the clock time information frame, until the clock time information frame is transmitted,
- creates the clock time information frame, and
- causes the transmitter to transmit the clock time information frame at a point in time when a period of time represented by the fixed value elapses from a point in time when the clock time information is obtained.

6. A method for synchronizing clock times performed in a node device in a network including a plurality of node devices, the method comprising:
- measuring, by a first node device, a clock time;
- receiving, by the first node device, a clock time information frame, which is a frame containing clock time information used for correcting the clock time, from a second node device;
- storing, by the first node device, a transmission processing time period, as a fixed value, which is a period of time from a point in time when the second node device obtains the clock time information until a point in time when the second node device transmits the clock time information frame;
- measuring, by the first node device, a reception processing time period, which is a period of time from a point in time when the clock time information frame is received until a point in time when the clock time information is obtained from the clock time information frame; and
- synchronizing, by the first node device, the clock times among the plurality of node devices by setting a value obtained by adding the fixed value and the reception processing time period to the clock time information, to the first node device.

7. The method for synchronizing clock times according to claim 6, comprising:
- obtaining, by the first node device, other clock time information representing the measured clock time after the clock time is synchronized using the clock time information contained in the received clock time information frame,
- creating, by the first node device, a clock time information frame containing the other clock time information such that the clock time information frame is transmitted at a point in time when a period of time represented by the fixed value elapses from a point in time when the other clock time information is obtained, and
- transmitting, by the first node device, the clock time information frame containing the other clock time information.

8. The method for synchronizing clock times according to claim 7, wherein
the plurality of node devices further include:
- a sensor for measuring a physical quantity;
- a wireless RF circuit including a first transmitter and a first receiver that are different from a second receiver for receiving a clock time information frame transmitted from the second node device and a second transmitter for transmitting a clock time information frame containing the other clock time information; and
- a second processing circuit that is different from a first processing circuit configured to measure the clock time, to measure the reception processing time period, to synchronize the clock time, to obtain the other clock time information, and to create a clock time information frame containing the other clock time information, and the method for synchronizing clock times further includes:
- processing, by the second processing circuit, a physical quantity measured by the sensor; and
- transmitting and receiving, by the wireless RF circuit, data processed by the second processing circuit.

9. The method for synchronizing clock times according to claim 7, further comprising:
- measuring, by the first node device, an elapsed time, which is a period of time that elapses from correcting the clock time; and
- stopping, by the first node device, creating the clock time information frame containing the other clock time information when it is detected that the elapsed time exceeds a threshold value determined as a function of a magnitude of an error allowed in the network.

* * * * *